United States Patent
Fujikawa

(10) Patent No.: US 6,763,516 B2
(45) Date of Patent: Jul. 13, 2004

(54) CONVENTION CHECKING APPARATUS, CONVENTION CHECKING SYSTEM, CONVENTION CHECKING METHOD, AND STORAGE MEDIUM ON WHICH IS RECORDED A CONVENTION CHECKING PROGRAM

(75) Inventor: Ryoko Fujikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 09/733,074

(22) Filed: Dec. 11, 2000

(65) Prior Publication Data

US 2001/0016939 A1 Aug. 23, 2001

(30) Foreign Application Priority Data

Jan. 31, 2000 (JP) ........................................ 2000-021980

(51) Int. Cl.[7] ................................................. G06F 9/44
(52) U.S. Cl. ........................ 717/112; 717/113; 717/117; 717/126
(58) Field of Search ................... 717/101–119, 120–126

(56) References Cited

U.S. PATENT DOCUMENTS 5,677,997 A * 10/1997 Talatik ........................... 706/45
6,256,773 B1 * 7/2001 Bowman-Amuah ......... 717/121

FOREIGN PATENT DOCUMENTS

| JP | A 7-141410 | 6/1995 | ........... G06F/17/50 |
| JP | A 10-143370 | 5/1998 | .............. G06F/9/44 |
| JP | A 11-73328 | 3/1999 | .............. G06F/9/45 |
| JP | A 11-85496 | 3/1999 | .............. G06F/9/06 |

OTHER PUBLICATIONS

Kim, "Automatic VHDL Synthesizability Checking based on the User–Defined Rules for ASIC Design", IEEE, pp.: 154–157, 1992.*
Maharaj et al., "On the Verification of VDM Specification and Refinement with PVS", IEEE, pp.: 280–289, 1997.*

* cited by examiner

Primary Examiner—Tuan Dam
Assistant Examiner—Ted T. Vo
(74) Attorney, Agent, or Firm—Staas & Halsey LLP

(57) ABSTRACT

When a convention is changed, a user modifies the class name and the method name of a convention checker, method parameters, etc., which are stored in a convention file in correspondence with a convention code. A convention checker unit within a convention checking apparatus checks whether or not a developed program conforms to a convention based on the modified contents in the convention file, that is, the class name, the method name, the method parameters, etc. As a result, it becomes unnecessary for the user to modify the convention checking program of the convention checking apparatus, when a convention is changed.

13 Claims, 29 Drawing Sheets

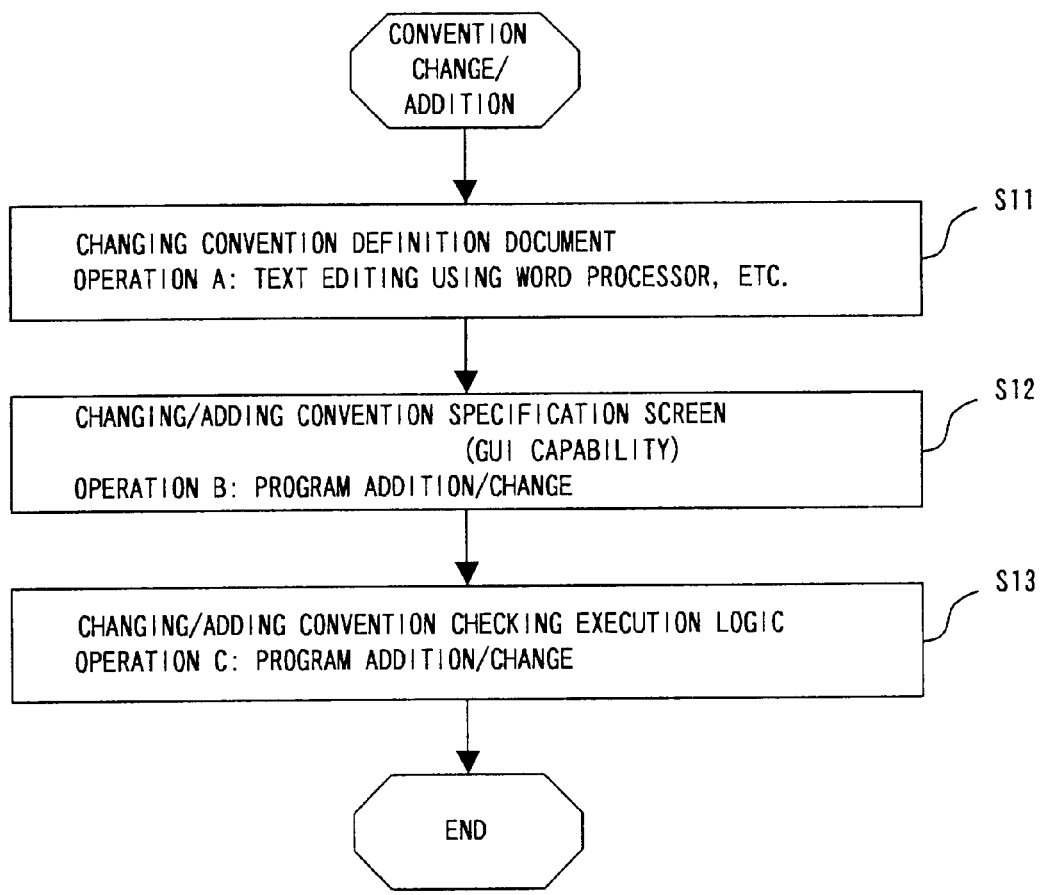
F I G. 1

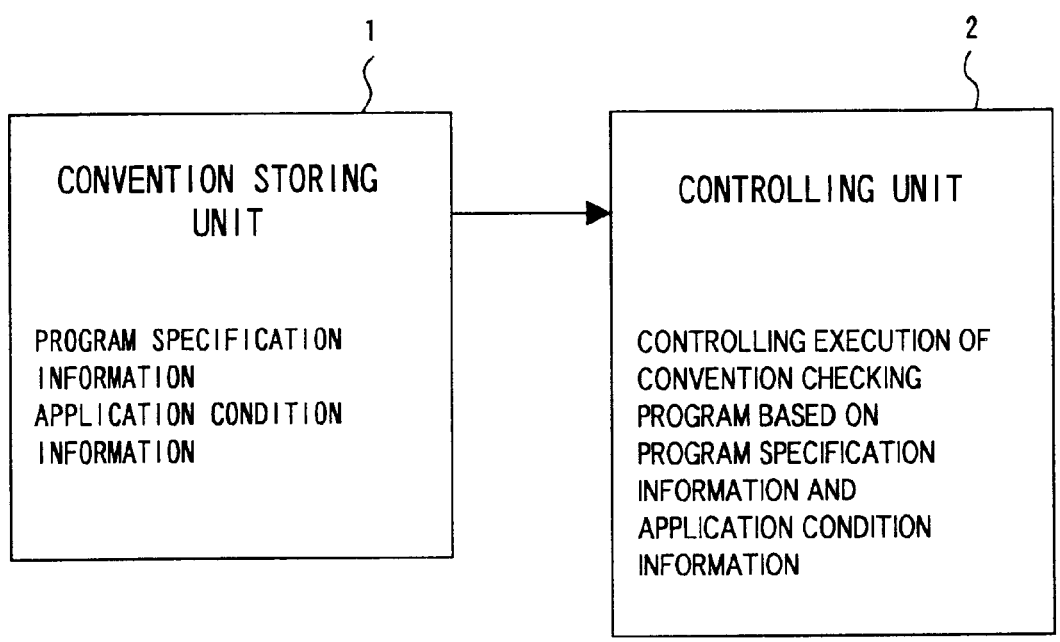
F I G. 2

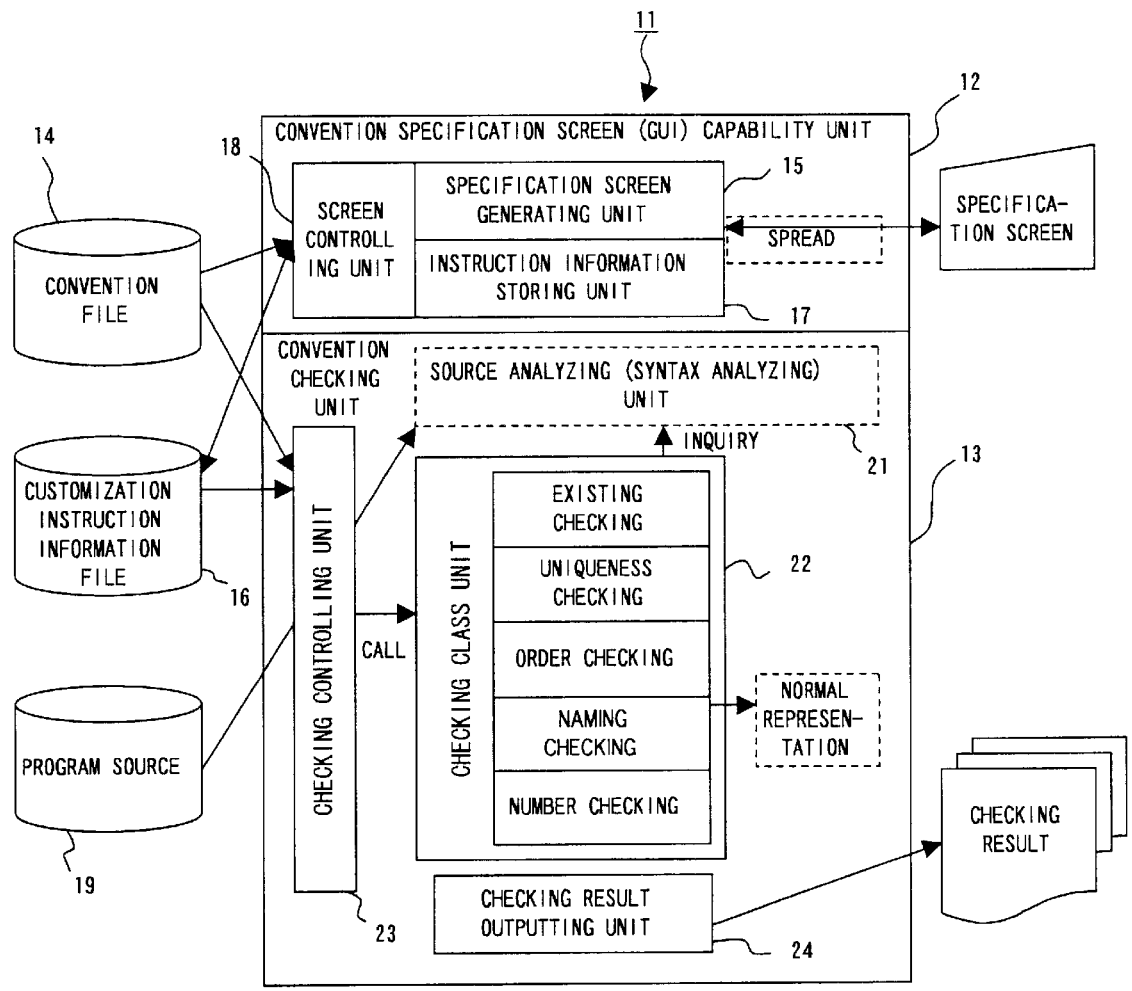
F I G. 3

FIG. 4

| DATA ENTRY | DESCRIPTION |
|---|---|
| CONVENTION CODE | MERGED KEY OF UNIQUE CONVENTION CODE AND CUSTOMIZATION INSTRUCTION INFORMATION |
| CONVENTION CONTENTS | CONVENTION CONTENTS |
| CLASS NAME | CLASS NAME OF CONVENTION CHECKER |
| METHOD NAME | METHOD NAME OF CONVENTION CHECKER |
| METHOD PARAMETERS (REPETITION) | PARAMETERS FOR CUSTOMIZATION WITH CHECKING PATTERN |
| CUSTOMIZATION | SPECIFYING CUSTOMIZATION PATTERN NAME IF CUSTOMIZATION IS SPECIFIED (EXAMPLE OF CUSTOMIZATION PATTERN)<br>LIST BOX<br>NUMERICAL VALUE<br>NUMERICAL VALUE RANGE<br>CHARACTER STRING |
| VALUE (REPETITION) | COMPONENT PROPERTY SPECIFICATION INFORMATION FOR EACH PATTERN IF CUSTOMIZATION IS SPECIFIED (EXAMPLE OF PROPERTIES OF CUSTOMIZATION PATTERN)<br>LIST BOX: SPECIFYING VALUES THAT CAN BE TAKEN HEREIN BY THE NUMBER OF VALUES<br>NUMERICAL VALUE: SPECIFYING INTEGRAL MINIMUM AND MAXIMUM VALUE<br>NUMERICAL VALUE RANGE: SPECIFYING MINIMUM VALUE RANGE (MINIMUM AND MAXIMUM VALUE), AND MAXIMUM VALUE RANGE (MINIMUM AND MAXIMUM VALUE) FOR RANGE<br>CHARACTER STRING: SPECIFYING THE NUMBER OF CHARACTERS THAT CAN BE INPUT (MINIMUM AND MAXIMUM NUMBER), AND CHARACTER STRING PATTERN THAT CAN BE INPUT |

| CONVENTION CODE | CONVENTION CONTENTS | CLASS NAME | METHOD NAME | NEGA-TION | PARAMETER | PARA-METER 2 | CUSTOMIZA-TION | VALUE 1 | VALUE 2 |
|---|---|---|---|---|---|---|---|---|---|
| K1f1001 | FILE NAME IS "CLASS NAME.JAVA" | Name Check | isName OK | | FileName | Class Name | | | |
| K1f1002 | CODE SCHEME IS SJIS | Check | isCode Type | | SJIS | | ListBox | SJIS | EUC |
| K1f1003 | FILE IS UP TO 500 LINES | Count Check | isCount OK | | File | 500 | NUMERICAL VALUE | 100 | 2000 |
| | | | | | | | | | |
| | | | | | | | | | |

F I G. 5

| DATA ENTRY | DESCRIPTION |
|---|---|
| CONVENTION CODE | CONVENTION CODE UNIQUELY DETERMINED IN CONVENTION FILE |
| APPLIED/UNAPPLIED | SPECIFYING WHETHER OR NOT CONVENTION IS APPLIED FOR PROJECT<br>EXAMPLE: CONVENTION CODE=APPLIED: CHECKING IS MADE<br>CONVENTION CODE=UNAPPLIED: CHECKING IS NOT MADE |
| DETAILED CONVENTION CUSTOMIZATION SETTING | CONTENTS OF DETAILED CONVENTION CUSTOMIZATION SETTING STORING INFORMATION SELECTED OR INPUT FROM CONVENTION INSTRUCTION SCREEN (GUI)<br>NAMING EXAMPLE: CONVENTION CODE "CUST"-SERIAL NUMBER IS NAMED AS KEYWORD |

F I G. 6

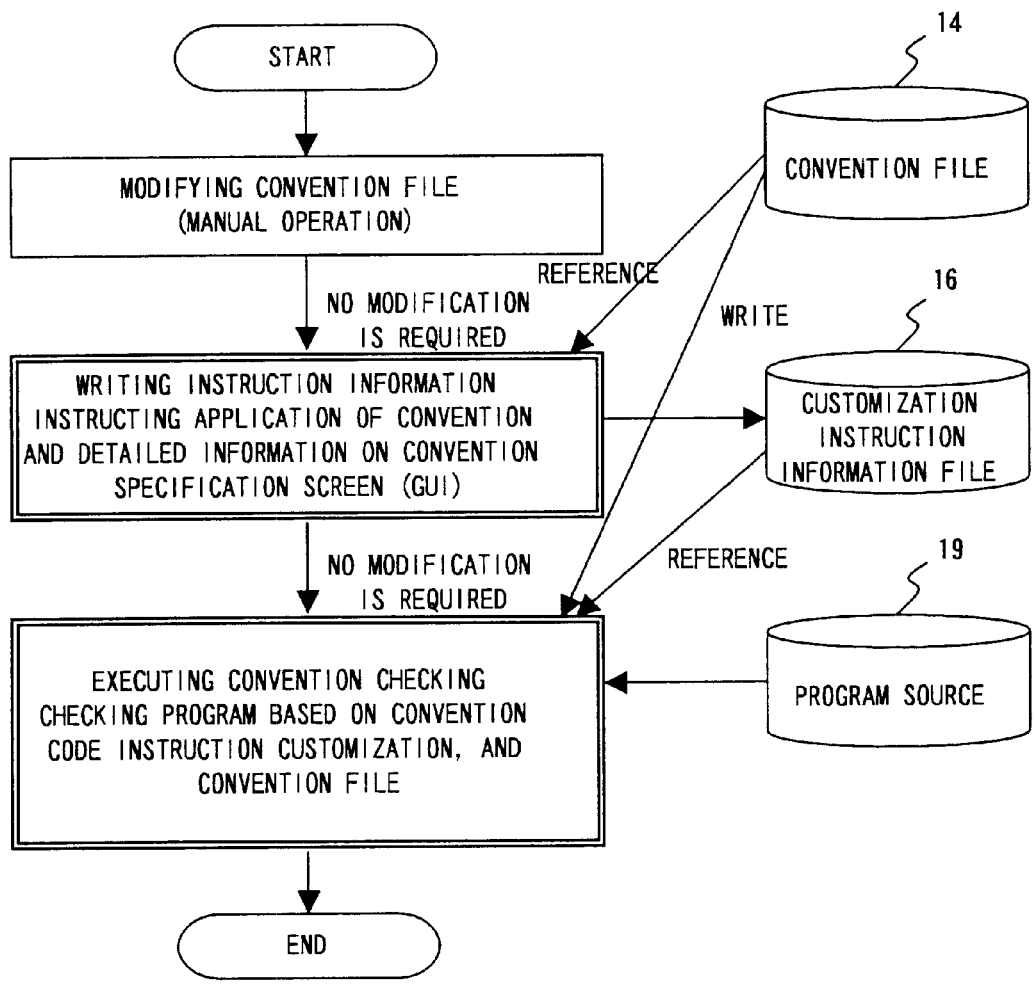
F I G. 8

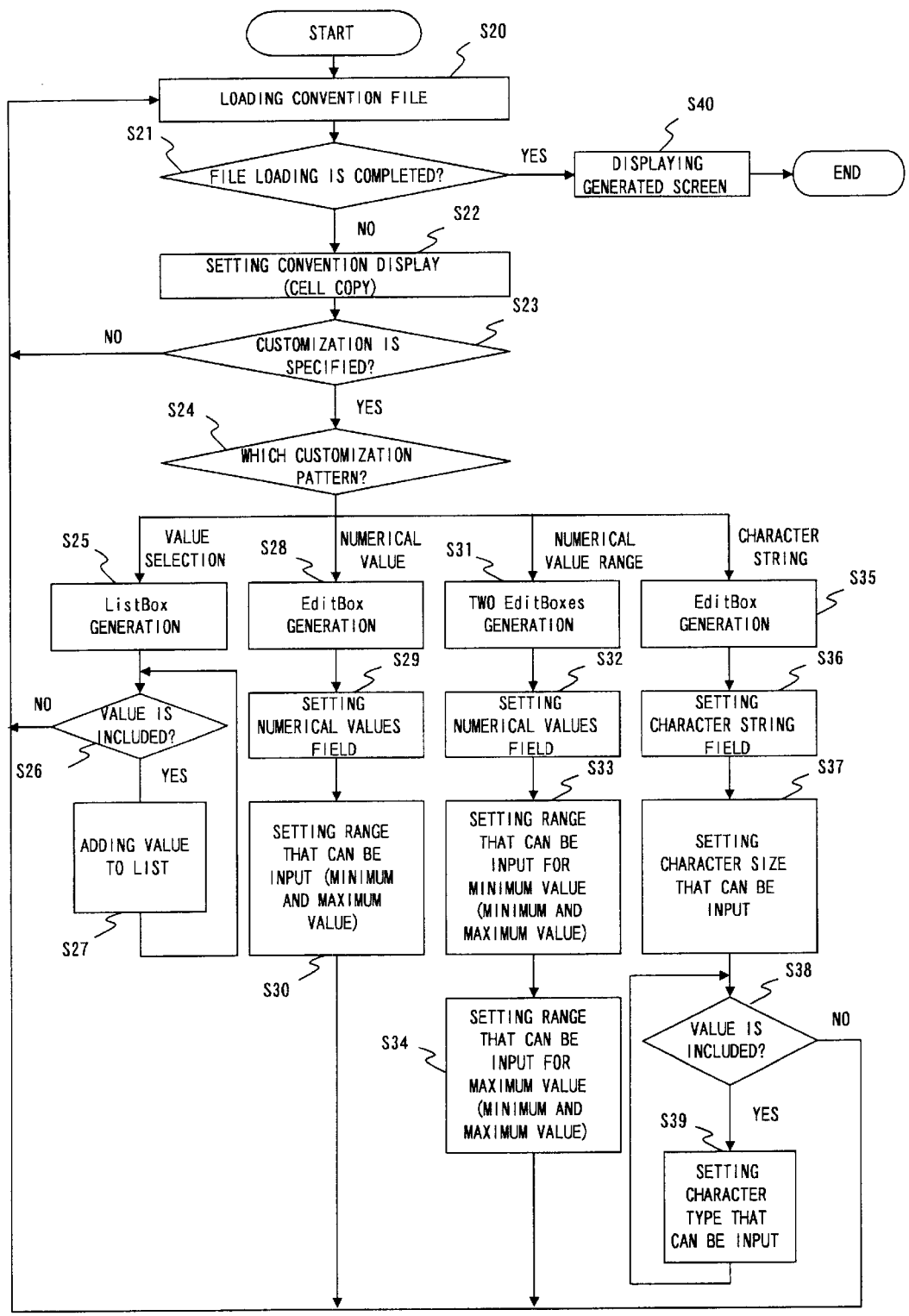
F I G. 9

| CONVENTION CONTENTS | CUSTOMIZATION | VALUE 1 | VALUE 2 |
|---|---|---|---|
| CODE SCHEME SPECIFICATION | ListBox | SJIS | EUC |
↑ ↑
LIST BOX VALUE
ListBox COMPONENT→
VALUE: SJIS OR EUC IS
SELECTABLE
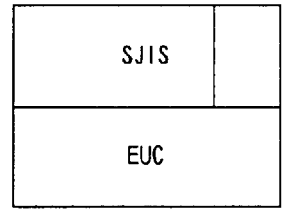
F I G. 1 0

| CONVENTION CONTENTS | CUSTOMIZATION | VALUE 1 | VALUE 2 |
|---|---|---|---|
| THE NUMBER OF SOURCE LINES IS UP TO 1000 | NUMERICAL VALUE | 100 | 9999 |

↑ MINIMUM VALUE  ↑ MAXIMUM VALUE

EditBox COMPONENT→
PROPERTY ONLY NUMERICAL VALUE

1000

MINIMUM VALUE 100    MAXIMUM VALUE 9999

F I G. 1 1

| Java DEVELOPMENT STANDARDIZATION CONVENTION CHECKER   CUSTOMIZER |||||||
|---|---|---|---|---|---|---|
| FILE ( F ) CONVENTION( K ) |||||||
| FILE CONVENTION | CODING CONVENTION | NAMING CONVENTION | COMMENT CONVENTION | PACKAGE CONVENTION |||

SELECT RANGE TO WHICH CONVENTION IS APPLIED    ALL ARE APPLIED    DETAILED SPACIFICATION

DEGREE OF IMPORTANCE
   A ESSENTIAL   B RECOMMENDED   C ARBITRARY    "A" IS APPLIED

| APPLIED/ UNAPPLIED | CLASSIFI- CATION | DEGREE OF IMPORTANCE | CONVENTION | NOTE | CUSTOMIZATION |
|---|---|---|---|---|---|
| APPLIED | FORMAT | A | ONE LINE IS UP TO 80 CHARACTERS | | 120 |
| UNAPPLIED | | A | CODE SCHEME IS SJIS | | SJIS <br> ~~EUC~~ |
| | | B | | | |

| END | ABORT | STORE | CONVENTION OUTPUT | HELP |
|---|---|---|---|---|

CUSTOMIZATION INSTRUCTION INFORMATION FILE  16

```
<FILE>
K1K10001=YES
K1K10001SIZE=120
K1F10002=YES
K1F10002CODE=SJIS
...
<FILE>
<CODING>
```

FIG. 14

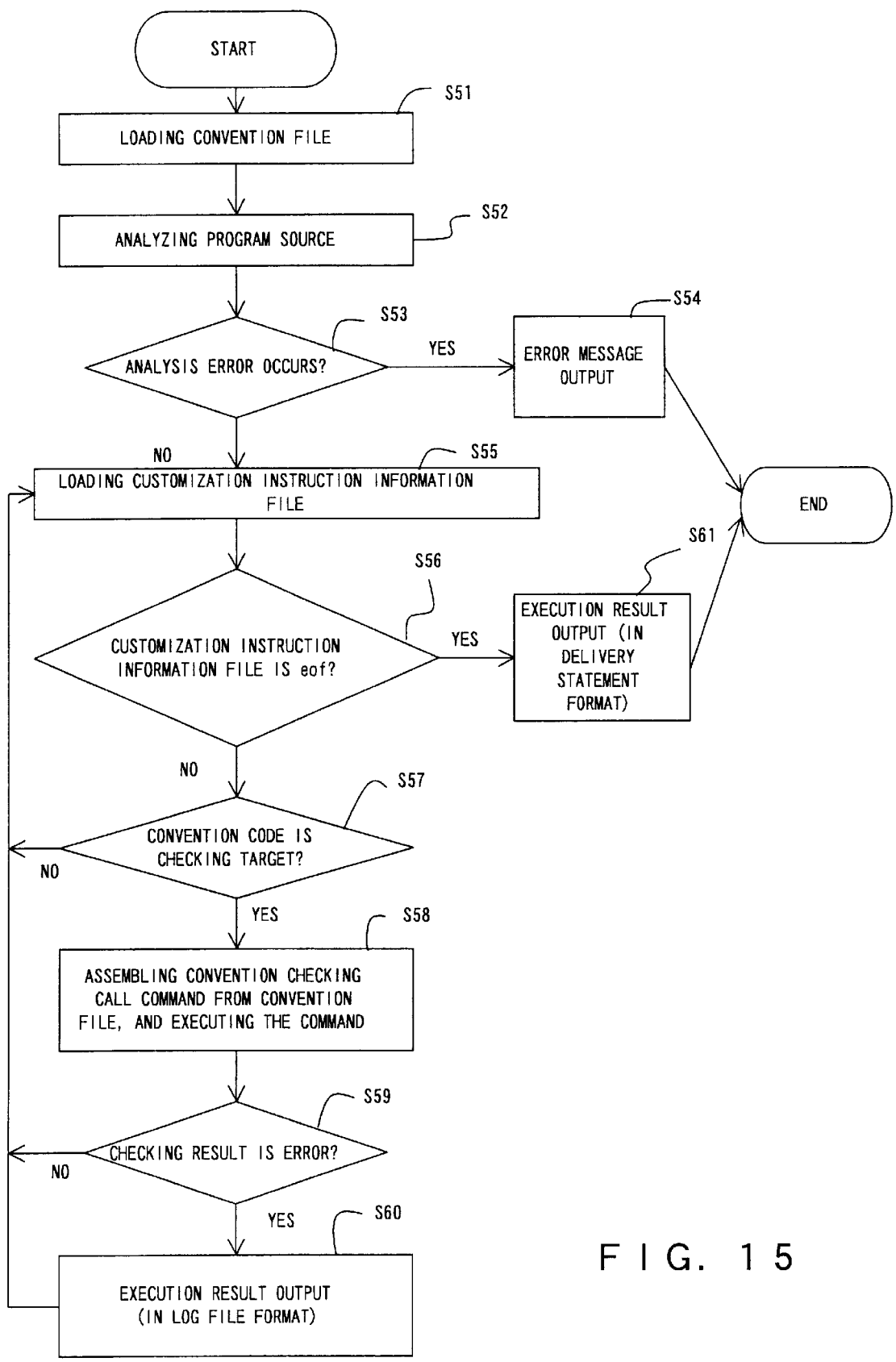
F I G. 15

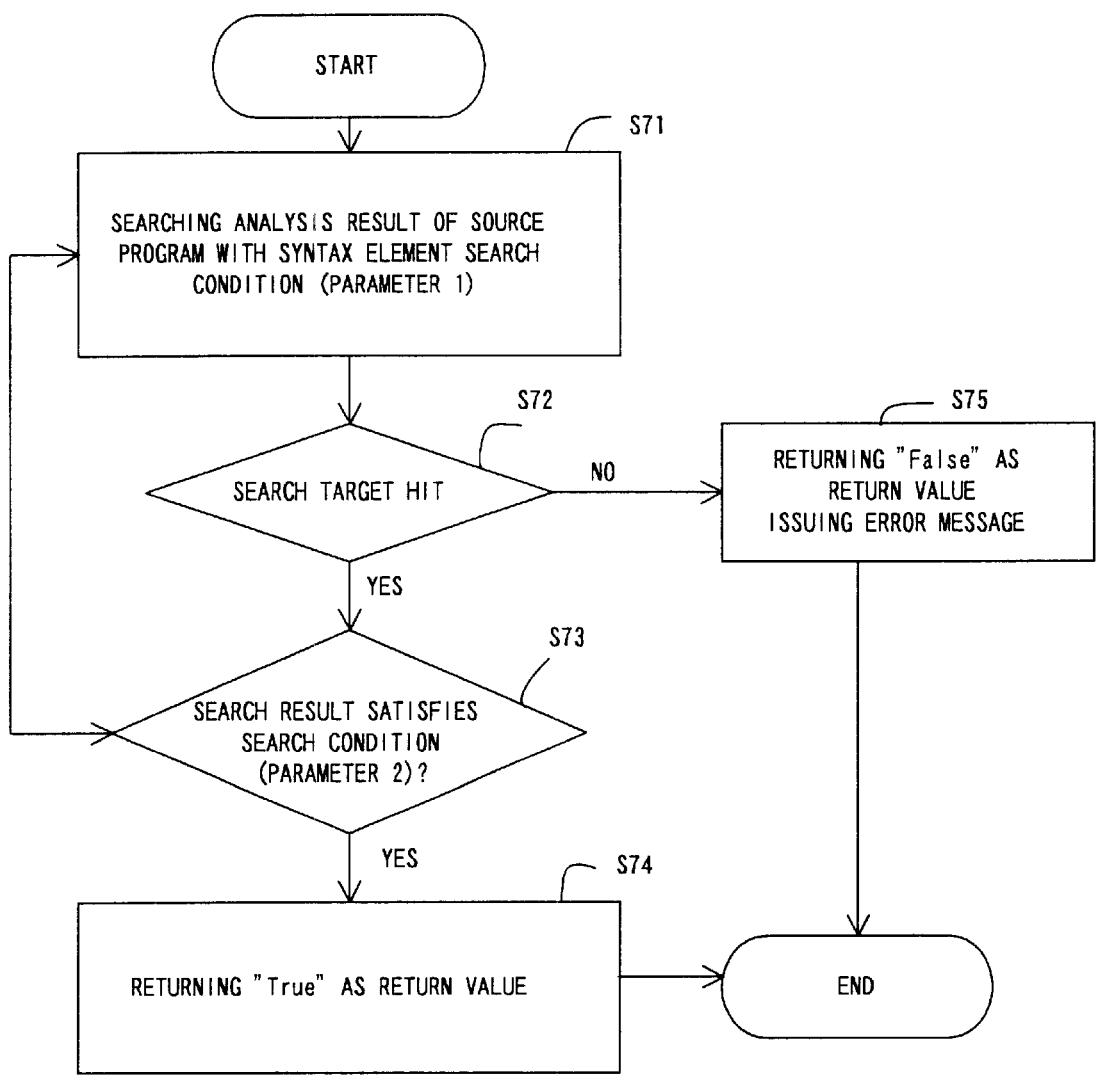
F I G. 1 6

```
        boolean isExist(parameta1, parameta2) · · · (1)
RETURN VALUE
        boolean:EXISTS IF TRUE.   DOES NOT EXIST IF FALSE
PARAMETER
        parameta1:SYNTAX ELEMENT KEYWORD BEING SEARCH TARGET.
                        FOR CLASS NAME   ClassDeclaration.IDENTIFIER
        parameta2:SEARCH CONDITION
                        FOR public class   public
EXAMPLE OF CHECKING
    WHETHER OR NOT public class EXISTS
        isExist(ClassDeclaration.IDENTIFIER, public) · · · (2)
                        ↑                                    ↑
                SYNTAX KEYWORD                       SEARCH CONDITION
```

F I G.  2 1

```
boolean isNameOK(parameta1, parameta2, parameta3) ···· (7)
RETURN VALUE DESCRIPTION
    boolean:PROPER CHECKING IF TRUE.  ERROR IF FALSE
PARAMETER DESCRIPTION
    parameta1 : SYNTAX KEYWORD BEING SEARCH TARGET.  REPRESENTED IN BNF FORMAT
              FOR CLASS NAME  ClassDeclaration.IDENTIFIER parameta2 : NAMING CONDITION
              PROPER NAME IS GIVEN IN NORMAL REPRESENTATION
              FOR FORWARD SEARCH  " ^ CAA"
              FOR BACKWARD SEARCH  "Panel $"

parameta3 : SEARCH TARGET RANGE
              RANGE WHERE NAME IS USED
              PACKAGE NAME IS SPECIFIED FOR JAVA EXAMPLE OF CHECKING
  PACKAGE com.F.CAA.gui CLASS BEGINS WITH "CAA"
    isNameOK(ClassDeclaration.IDENTIFIER, ^CAA, com.F.CAA.gui) ···· (8)
```

↑         ↑        ↑
SYNTAX KEYWORD  NAMING  TARGET
             CONDITION  RANGE

F I G. 24

```
boolean isCountOK (parameta1, parameta2, parameta3) ···(9)
RETURN VALUE DESCRIPTION
  boolean:WITHIN RANGE IF TRUE.  ERROR (OUT OF RANGE) IF FALSE
PARAMETER DESCRIPTION
  parameta1 : SYNTAX KEYWORD WITHIN SEARCH TARGET RANGE.   REPRESENTED IN BNF FORMAT
             FOR METHOD  MethodDeclaration.IDENTIFIER
             FOR ENTIRE FILE  File
  parameta2 : MINIMUM VALUE
  parameta3 : MAXIMUM VALUE EXAMPLE OF CHECKING
  NUMBER OF LINES OF METHOD IS UP TO 100?
  isCountOK(MethodDeclaration.IDENTIFIER, 1, 100) ···(10)
```

SYNTAX KEYWORD WITHIN SEARCH RANGE     MINIMUM   MAXIMUM
                                                             VALUE     VALUE

FIG. 25

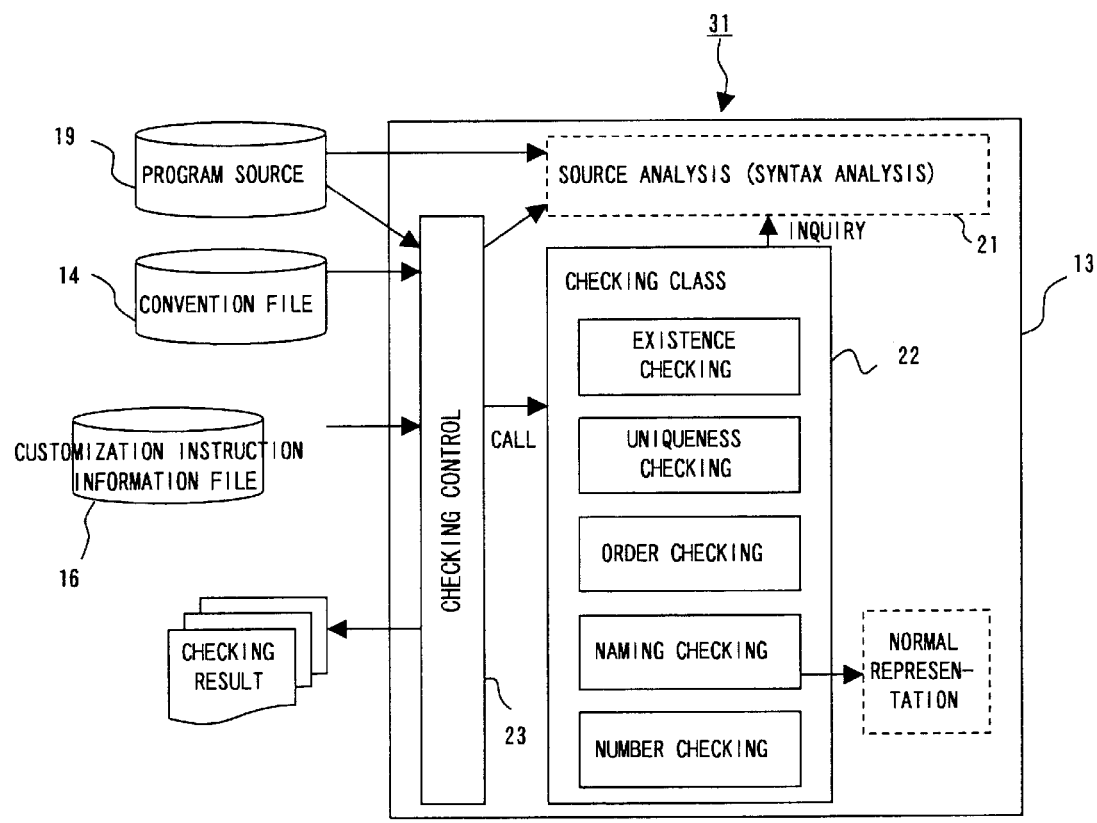
F I G. 26

```
JAVA DEVELOPMENT STANDARDIZATION CONVENTION CHECKING EXECUTION LOG    TARGET FILE : aaa, java
EXECUTION DATE : 1999/11/20   11:20 c:\temp\com\F\caa\aaa.java(1 0) : VIOLATES CODING CONVENTION OF CONVENTION CODE
  K1C10005 "ONE DECLARATION IN ONE LINE IN PRINCIPLE"
c:\temp\com\F\caa\aaa.java(3 5) : VIOLATES CODING CONVENTION OF CONVENTION CODE
  K1C10015 "--- WITHOUT BREAKING IN switch STATEMENT"
NUMBER OF VIOLATIONS "2"
JAVA DEVELOPMENT STANDARDIZATION CHECKING EXECUTION LOG    TARGET FILE : bbb. Java
EXECUTION DATE : 1999/11/20   11:20

NUMBER OF VIOLATIONS "0"

EXECUTION PROPERLY TERMINATED CODE=0
```

F I G. 27

| CHECKING DATE : | | RESPONSIBLE PERSON : | | |
|---|---|---|---|---|
| PROGRAM NAME : | | | | |

FILE CONVENTIONS

| | CLASSIFI-CATION | TYPE | CONVENTION | VIOLATED/NOT VIOLATED | ACTION (ANSWER) |
|---|---|---|---|---|---|
| 1 | COMMON | J | JAPANESE IS NOT USED IN FILE NAME | | |
| 2 | | J | CASE-SENSITIVE FOR ENGLISH FILE NAME | | |
| 3 | | J | ONE SOURCE FILE FOR ONE public CLASS (EXCLUDING INTERNAL CLASS) | | |
| 4 | | J | FILE NAME IS "CLASS NAME. Java" OR "INTERFACE NAME. Java" | | |
| 5 | | B | CODE SCHEME IS SJIS | | |
| 6 | | B | FILE IS NAMED IN ACCRDANCE WITH NAMING CONVENTION OF CLASS NAME | | |
| 7 | | B | FILE IS UP TO 1000 LINES (EXCLUDING COMMENT) | | |

FIG. 28

CONVENTION CHECKING APPARATUS, CONVENTION CHECKING SYSTEM, CONVENTION CHECKING METHOD, AND STORAGE MEDIUM ON WHICH IS RECORDED A CONVENTION CHECKING PROGRAM

BACKGROUND OF THE INVENTION

1. Field of the Invention

The present invention relates to an apparatus, a system, and a method checking whether or not a developed program conforms to conventions, and a storage medium on which is recorded a convention checking program.

2. Description of the Related Art

When a program is developed, conventions for development standardization are generated and applied to program coding so as to expedite the program to be shared and standardized. If a program is developed under certain conventions, it must be checked whether or not the program conforms to the conventions at a predetermined phase of the program development or upon completion of the program.

As a method checking whether or not a program conforms to conventions, there is a method with which a human being checks whether or not a generated program conforms to conventions. With this method, however, man-hours, that is, a checking time is required. As the scale of program development increases, the man-hours for checking the program becomes enormous. Additionally, if checking is made by a human being, there arises a difference in a checking level depending on the degree of skillfulness of the person who makes the checking. Accordingly, there is a possibility that a programming error cannot be found by the checking. For these reasons, a convention checking apparatus having the above described convention checking capability is considered.

With a conventional convention checking apparatus, however, its program must be modified in correspondence with a convention addition or change if it is made.

FIG. 1 shows the flow of modification operations in a conventional convention checking apparatus.

To change a convention definition document, the document is edited by using a word processor, etc. (step S11 of FIG. 1). Next, a program for generating a convention specification screen is modified to change or add this screen in correspondence with this change or addition (step S12). Lastly, the program is modified to change the convention checking logic in correspondence with the convention change (step S13).

As described above, with the conventional convention checking apparatus, a user must modify the program of the convention checking apparatus if a convention is changed or added. As a result, a large amount of time is required to modify the program, and a quick action cannot be taken at the time of a convention change. Additionally, since there is a great possibility that development conventions are changed many times during development, it is desirable to take quick and easy measures for a convention change.

SUMMARY OF THE INVENTION

An object of the present invention is to decrease the user operations for modifying the program of a convention checking apparatus, which accompany a convention change.

The present invention is a convention checking apparatus checking whether or not a program conforms to conventions being the standards when a program is developed. This apparatus comprises: a convention storing unit storing program specification information for specifying a convention checking program which checks whether or not a developed program conforms to a convention, and application condition information for specifying an application condition of a convention; and a controlling unit executing the convention checking program based on the program specification information and the application condition information, which are stored in the convention storing unit, and checking whether or not a developed program conforms to the convention.

The convention checking apparatus comprises: a convention storing unit storing program specification information for specifying a convention checking program which checks whether or not a developed program conforms to conventions, and application condition information for specifying an application information of a convention; and a controlling unit executing the convention checking program based on the program specification information and the application condition information, which are stored in the convention storing unit, and customization instruction information indicating the contents of convention customization instructed by a user, and checking whether or not the development program conforms to a customized convention.

BRIEF DESCRIPTION OF THE DRAWINGS

FIG. 1 shows the flow of modification operations in a conventional convention checking apparatus;

FIG. 2 is a block diagram showing the fundamental configuration of a convention checking apparatus according to a preferred embodiment;

FIG. 3 shows the configuration of the convention checking apparatus;

FIG. 4 shows the configuration of a convention file;

FIG. 5 exemplifies the convention file;

FIG. 6 shows the configuration of a customization instruction information file;

FIG. 8 shows the operations performed when a program is checked with the convention checking apparatus;

FIG. 9 is a flowchart showing the process generating a convention specification screen (GUI);

FIG. 10 explains a customization pattern for a value selection;

FIG. 11 explains a customization pattern for a numerical value input;

FIG. 14 shows a convention specification screen and a customization instruction information file;

FIG. 15 is a flowchart showing the process of a convention checker;

FIG. 16 is a flowchart showing the process for checking an existence;

FIG. 21 exemplifies an existence checking program;

FIG. 24 exemplifies a naming checking program;

FIG. 25 exemplifies a number checking program;

FIG. 26 shows the configuration of a convention checking apparatus according to a second preferred embodiment;

FIG. 27 exemplifies an output in a log file format;

FIG. 28 exemplifies an output in a delivery statement format; and

DESCRIPTION OF THE PREFERRED EMBODIMENTS

Figure 7:
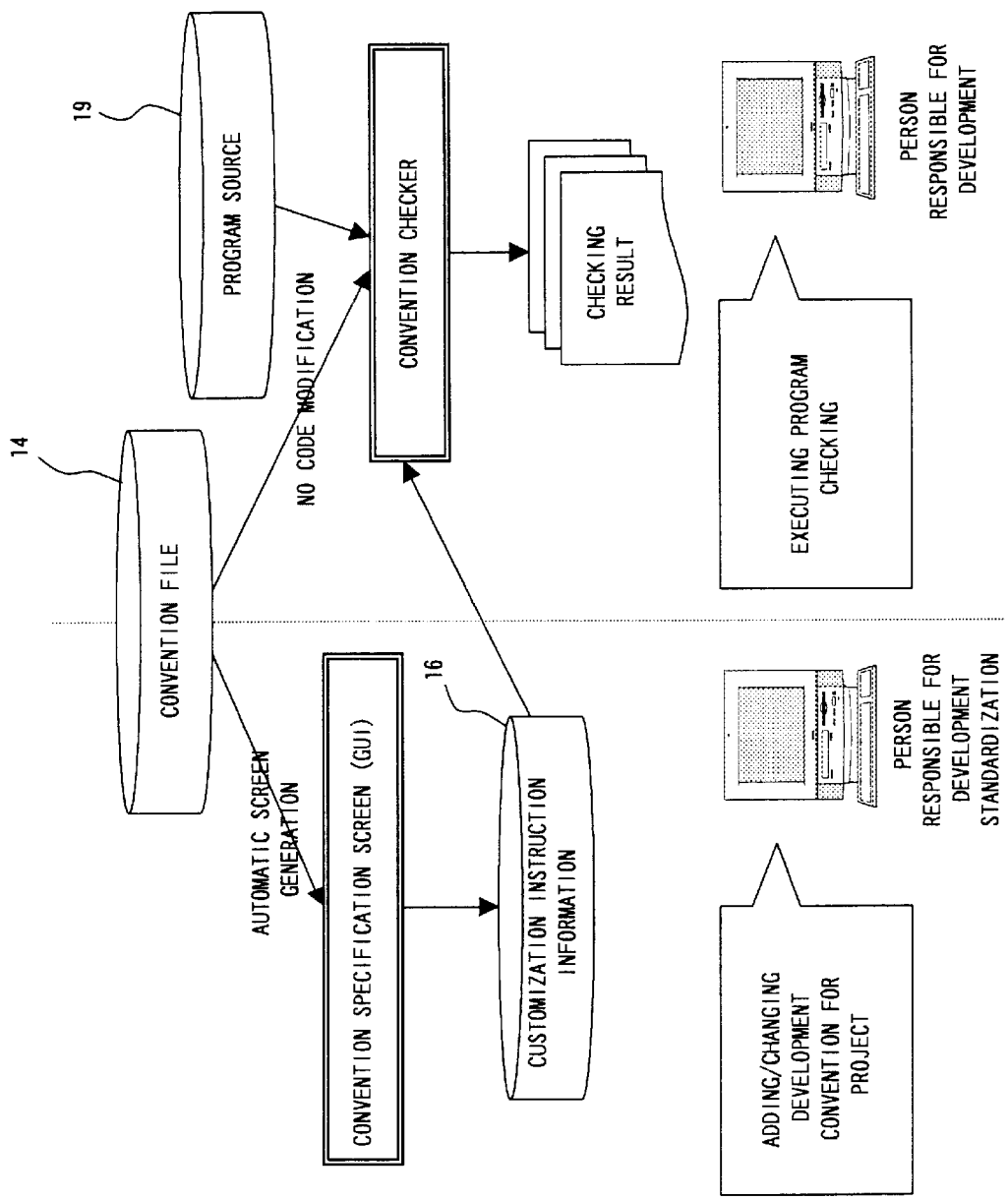
FIG. 7 explains the capabilities of the convention checking apparatus.

FIG. 2 shows the fundamental configuration of a convention checking apparatus according to a preferred embodiment of the present invention. This convention checking apparatus is an apparatus which checks whether or not a program conforms to conventions being the standards when a program is developed. The convention checking apparatus comprises: a convention storing unit 1 storing program specification information for specifying a convention checking program which checks whether or not a developed program conforms to a convention, and application condition information for specifying an application condition of a convention; and a controlling unit 2 executing the checking program based on the program specification information and the application condition information, which are stored in the convention storing unit 1, and checking whether or not a developed program conforms to the convention.

Additionally, the convention checking apparatus may comprise: a convention storing unit 1 storing program specification information for specifying a convention checking program which checks whether or not a developed program conforms to a convention, and application condition information for specifying an application condition of a convention; and a controlling unit 2 executing the checking program based on the program specification information and the application condition information, which are stored in the convention storing unit 1, and customization instruction information indicating the contents of convention customization instructed by a user, and checking whether or not a developed program conforms to the convention.

Furthermore, the convention checking apparatus may comprise: a convention storing unit 1 storing program specification information for specifying a convention checking program which checks whether or not a developed program conforms to a convention, application condition information for specifying an application condition of a convention, and a customization pattern for customizing a convention; a convention specification screen generating unit generating a convention specification screen for customizing a convention based on the customization pattern stored in the convention storing unit 1; a customization instruction information storing unit for storing customization instruction information indicating the contents of convention customization input from the convention specification screen; and a controlling unit (2?) executing the convention checking program based on the program specification information and the application condition information, which are stored in the convention storing unit 1, and the customization instruction information stored in the customization instruction information storing unit, and checking whether or not a developed program conforms to the customized convention.

If a convention is changed, a user changes the program specification information or the application condition information of the convention, which is stored in the convention storing unit 1, in correspondence with the change. When it is checked whether or not a developed program conforms to the convention, the controlling unit 2 within the convention checking apparatus controls the execution of a convention checking program based on the program specification information and the application information of the convention, which are stored in the convention storing unit 1.

Assume that a class name and a method name for making convention checking as program specification information, and method parameters as application condition information are set in the convention storing unit 1. If a convention is changed, it is sufficient for a user to change the class name, the method name, or the method parameters set in the convention storing unit. The controlling unit 2 controls the execution of a convention checking program based on the class name, the method name, and its parameters, which are stored in the convention storing unit 1. In this way, the user can check whether or not the developed program conforms to the changed convention without modifying the convention checking program.

According to this preferred embodiment, there is almost no need for a user to modify a convention checking program, even if a convention is changed or added. Furthermore, there is almost no operations for modifying a program when a convention is changed or added, thereby taking a quick action for a convention change or addition.

Besides, a customization pattern for customizing a convention is stored in the convention storing unit 1, and a convention specification screen for customizing the convention is generated based on the convention customization pattern. Consequently, a user no longer need to modify the program for generating the convention specification screen even if a convention is changed.

Next, the preferred embodiments according to the present invention will be explained more specifically.

FIG. 3 shows the configuration of a convention checking apparatus 11 according to a first preferred embodiment of the present invention. The following preferred embodiment refers to an example where the program for generating a convention specification screen intended for customizing a convention, the program for making convention checking, etc. are generated in an object-oriented programming language (such as Java).

The convention checking apparatus 11 is composed of a convention specification screen capability unit 12, and a convention checker (checking) unit 13.

The convention specification screen capability unit 12 comprises: a specification screen generating unit 15 generating a GUI convention specification screen based on the convention stored in a convention file 14; an instruction information storing unit 17 storing in a customization instruction information file 16 customization instruction information indicating the contents of convention customization specified by a user on the convention specification screen, that is, the customization instruction information instructing a particular convention applied to a particular development project, or an application condition of a particular convention, etc.; and a screen controlling unit 18 controlling these units.

The convention checker unit 13 comprises: a source analyzing unit 21 analyzing the syntax of a developed program stored in a program source 19; a checking class unit 22 checking whether or not a target program conforms to conventions; a checking controlling unit 23 reading a convention from a convention file 14, writing/reading customization instruction information to/from a customization instruction information file 16, and controlling the execution of convention checking, etc.; and a checking result outputting unit 24 outputting a result of the convention checking. The checking class unit 22 is composed of existence checking, uniqueness checking, order checking, naming checking, number checking, etc. The contents of these checking types will be described later.

FIG. 4 shows the configuration of the convention file 14. The convention file 14 is configured by a uniquely determined convention code within the convention file 4, the contents of a convention, the class name and the method name (program specification information) of a convention checker, the parameters of the method (convention application information), the name of a customization pattern when a convention is customized for each project, and property specification information for specifying the numerical value, the numerical value range, etc. of the customization pattern.

By way of example, for a checking program for checking whether or not the maximum number of lines in the file of a convention code "k1f003" shown in FIG. 5(?) is equal to or smaller than 500, a search target is set to be "File" as a parameter 1 of a method "isCountok", and the maximum number of lines is set to be "500" as a parameter 2.

Additionally, as the property specification information of a customization pattern, for example, the minimum value "100" and the maximum value "2000" among the values that can be input are set as the values of a customization pattern for a numerical value input(?).

In this preferred embodiment, a plurality of customization patterns of standard conventions for generating a convention specification screen are prepared, and the names of the customization patterns and their property specification information are set in the convention file 14, so that the convention specification screen can automatically be generated based on these information. As a result, the convention specification screen that conforms to a changed or added convention can automatically be generated only by user modifying the contents of the convention file 14 without modifying the program for generating the convention specification screen, even if a convention is changed or added.

FIG. 5 exemplifies the convention file 14. This example shows that the file name is "class name.java" as the contents of a convention code "k1f1001 (?)", a coding scheme is "Shift-JIS" as the contents of a convention code "k1f1002 (?)", and a file is up to 500 lines as the contents of the convention code "k1f1003". Additionally, the customization pattern name for generating a list box is set for the convention code "k1f1002" and the customization pattern name for a numerical value input is set for the convention code "k1f1003 (?)".

As the customization pattern names stored in the convention file 14, by way of example, "ListBox" generating a list box for making a selection from among predetermined values on the convention specification screen, a "numerical value" generating an edit box to which a numerical value within a predetermined range is input, a "numerical value range" generating an edit box to which a numerical value range is input, and the like. are set.

Furthermore, for the values of customization patterns, by way of example, the customization pattern for generating a list box, selectable numerical values to be displayed in a list box, or characters (such as SJIS, and EUC) are set as the values of the customization pattern for generating a list box. For the customization pattern for generating an edit box to which a numerical value is input, the minimum and the maximum value among the numerical values that can be input to the edit box are set. Additionally, for the customization pattern for generating the edit box to which a numerical value range is input, the minimum or the maximum value among the values that can be input is set as the lower limit value of the numerical value range, and the minimum or the maximum value among the numerical values that can be input is set as the upper limit range. Furthermore, for the customization pattern for generating the edit box to which characters are input, the number of characters that can be input to the edit box, and the character type are set.

FIG. 6 shows the configuration of the customization instruction information file 16 storing the customization instruction information indicating the contents of a convention customized on a convention specification screen.

The customization instruction information file 16 is composed of a unique convention code in the convention file 14, the information specifying whether or not to apply the convention code to a target project, and the information indicating the detailed contents of convention customization input from the convention specification screen. Note that the correspondence between the instruction information within the customization instruction information file 16 and the information within the convention file 14 is made by a convention code.

The capabilities of the convention checking apparatus 11 having the above described configuration are described by referring to FIG. 7.

In this preferred embodiment, the class name and the method name of a convention checker, the parameters of the method, a customization pattern for a value selection, a numerical value input, a numerical value range input, a character string input, etc., and its property specification information are set in correspondence with a convention code in the convention file 14. If a convention is changed or added, the convention specification screen capability unit 12 automatically generates a GUI convention specification screen based on a customization pattern name and its property specification information within the modified convention file 14.

Accordingly, the only operation that a person who is responsible for development standardization must perform is to customize a development convention for a project on a displayed convention specification screen. This eliminates the need for modifying the program for generating the convention specification screen when a convention is changed. The customization instruction information of the convention customized by the user at this time is stored in the customization instruction information file 16.

Furthermore, the convention checker unit 13 checks whether or not a developed program conforms to conventions based on the information of the convention checker within the convention file 14, such as the class name of the checker, the method name, and the method parameters.

Accordingly, the person who is responsible for development can examine whether or not the developed program stored in the program source 19 conforms to conventions only by checking the program with the convention checking apparatus 11, even if a convention is changed.

FIG. 8 shows the procedures when a program is checked with the convention checking apparatus 11.

When a convention is changed or added, a user changes or adds the convention in the convention file 14 from an input unit, etc. of the convention checking apparatus 11.

When the convention file 14 is modified, the convention checking apparatus 11 automatically generates a convention specification screen based on the modified convention. A user customizes the convention for a project on the displayed convention specification screen. The customization instruction information input at this time is stored in the customization instruction information file 16.

When the user specifies a program and instructs the checking of the program, it is checked whether or not the program conforms to the customized convention based on the convention file 14 and the customization instruction information.

According to this preferred embodiment, the only operation that a user must perform is to modify the convention file 14 if a convention is changed, eliminating the need for performing the conventional operations for modifying the convention specification screen generation program and the convention checking program in correspondence with the convention change. As a result, man-hours for program modification operations can significantly be reduced. Furthermore, program modification can be simplified, thereby taking a quick action for a convention change.

Next, the operations of the convention specification screen capability unit 12 that generates a convention specification screen are explained by referring to the flowchart shown in FIG. 9 and the schematics shown in FIGS. 10 through 13.

FIG. 9 is a flowchart showing the process for generating a GUI convention specification screen based on four types of a customization pattern such as a pattern for a value selection, a pattern for a numerical value input, a pattern for a numerical value range input, and a pattern for a character string input, in the case where these patterns are set in the convention file 14.

First of all, the convention file 14 is loaded (step S20 of FIG. 9). Then, it is determined whether or not the entire convention file has been loaded (step S21).

If the entire convention files has not been loaded yet ("NO" in step S21), the process proceeds to step S22 where the loaded conventions are copied and prepared to be displayed on the convention specification screen. It is then determined whether or not customization is specified in a convention code (step S23). If customization is specified in the convention code ("YES" in step S23), it is determined which of the patterns for a value selection, a numerical value input, a numerical value range input, and a character string input this pattern is (step S24).

If the customization pattern is determined to be the customization pattern for a value selection in step S24, the process proceeds to step S25 where a list box to be displayed on the convention specification screen is generated. Next, it is determined whether or not the value to be set in the list box is included in the customization pattern for a value selection within the convention file 14 (step S26). If the value is determined to be set ("YES" in step S26), it is added to the list box (step S27). Then, the process goes back to step S26 where it is determined whether or not another value is set. If it is determined that another value is set in the customization pattern for a value selection, this value is added to the list.

If the result of the determination made in step S26 becomes "NO" after adding all the values set in the customization pattern for a value selection are added to the list, the process goes back to step S20 where the next data in the convention file 14 is loaded.

With these operations, a list box for a value selection is generated on the convention specification screen, and the value of the customization pattern for a value selection within the convention file 14 is automatically set in the list box.

FIG. 10 shows the contents of a customization pattern for a value selection, and a list box component that is automatically generated based on this customization pattern.

If a customization pattern for a value selection is set in a convention code, a list box is generated as a component to be displayed on a convention specification screen. Additionally, "SJIS" and "EUC(?)", which are set as the values of the customization pattern, are displayed in the generated list box as the values which can be selected by a user.

If it is determined that the customization pattern is a pattern for a numerical value input in step S24 of FIG. 9, the process proceeds to step S28 where an edit box to be displayed on the convention specification screen is generated. Next, a numerical value input field is set in the edit box (step S29). Then, the first and the second value of the customization pattern for a numerical value input within the convention file 14 are respectively set as the minimum and the maximum value among the numerical values that can be input to the numerical value input field (step S30).

With these operations, the numerical value input field is generated on the convention specification screen, and the minimum and the maximum value among the numerical values that can be input to the numerical value input field are automatically set.

FIG. 11 exemplifies a customization pattern for a numerical value input, and an edit (box?) component that is automatically generated based on this customization pattern.

As shown in FIG. 11, an edit box is generated as a component to be displayed on a convention specification screen, if a customization pattern for a numerical value input is set in a convention code.

By way of example, if "100" and "9999" are set as the values of the customization pattern for a numerical value input, "100" and "9999" are automatically set as the minimum and the maximum value among the values that can be input to the numerical value input field of the edit box.

If it is determined that the customization pattern is a pattern for a numerical value range input in step S24 of FIG. 9, the process proceeds to step S31 where two edit boxes are generated. Then, a numerical value input field is set in each of the edit boxes (step S32). The first and the second value of the customization pattern for a numerical value range input, which are stored in the convention file 14, are respectively set as the minimum and the maximum value of the numerical value input field to which the lower limit value (minimum value) of the numerical value range is input (step S33).

Similarly, the third and the fourth value of the customization pattern for a numerical value range input in the convention file 14 are respectively set as the minimum and the maximum value of the upper limit value (maximum value) of the numerical value range (step S34).

With these operations, the numerical value range input fields are generated on the convention specification screen, and the numerical value ranges that can be input to the input fields are automatically set.

Figure 12:
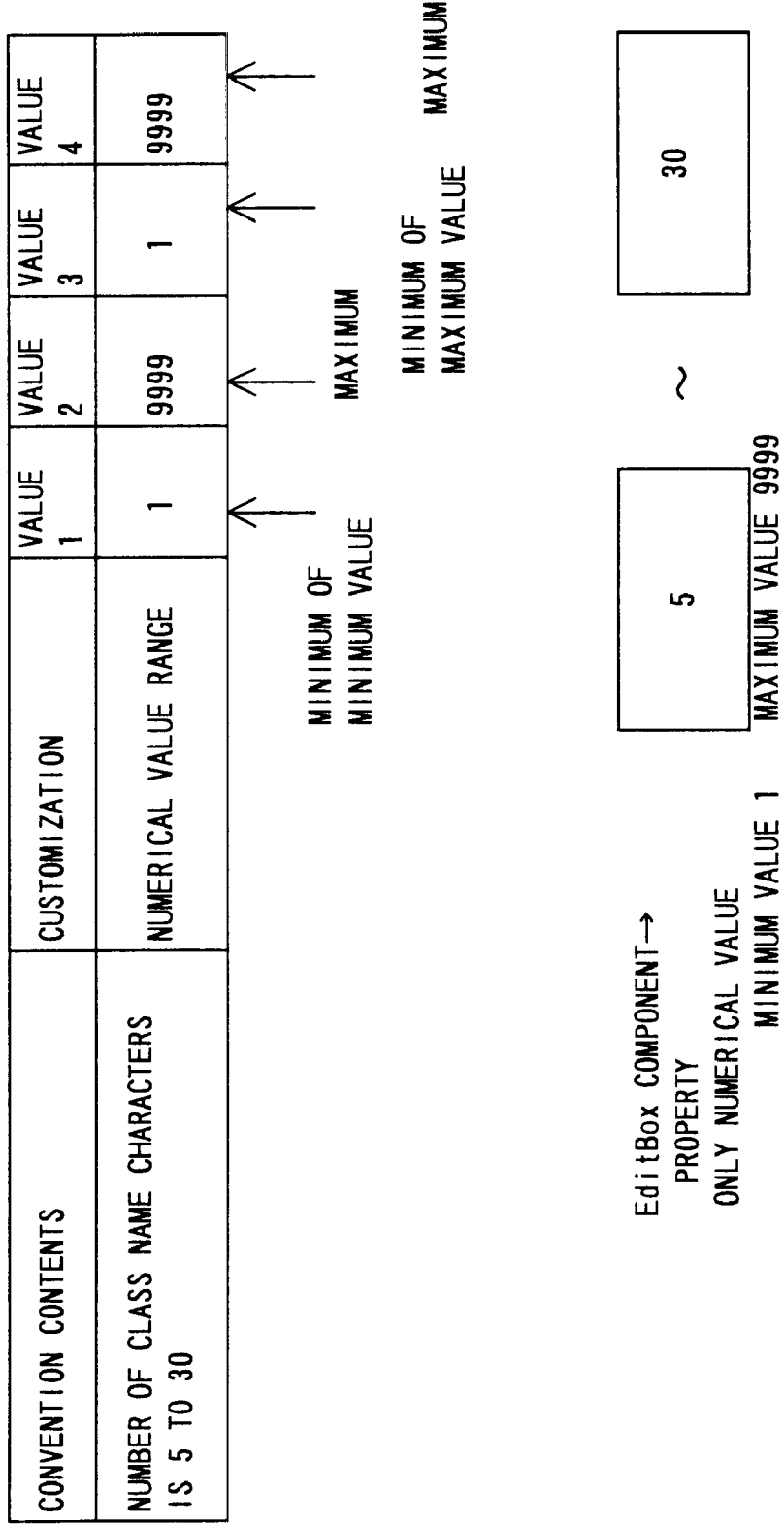
FIG. 12 explains a customization pattern for a numerical value range input.

FIG. 12 exemplifies the contents of a customization pattern for a numerical value range input, and a component that is automatically generated based on this customization pattern.

This figure shows that an edit box is automatically generated as a component to be displayed on a convention specification screen, "1" of a value 1 and "9999" of a value 2 are respectively set as the minimum and the maximum value of the lower limit value (minimum value) that can be input to the edit box, and "1" of a value 3 and "9999" of a value 4 are respectively set as the minimum and the maximum value of the upper limit value (maximum value).

In this case, the smallest and the largest numbers of characters for a class name are "5" and "30" as the contents of the convention. Therefore, a numerical value range "5 to 30" is set in the edit (box?) component.

If it is determined that the customization pattern is a pattern for a character string input in step S24 of FIG. 9, the process proceeds to step S35 where an edit box is generated. Then, a character string input field is set in the edit box (step S36). Next, the first value of the customization pattern for a character string input in the convention file 14 is set in the character string input field as the number of characters that can be input (step S36).

Then, it is determined whether or not another value is set in the customization pattern for a character string input (step S38). If the second value is set in the customization pattern for a character string input ("YES" in step S38), the set value, in this case, the character type that can be input is set (step S39).

With these operations, the character string input field is generated on the convention specification screen, and the number of characters and the character type, which can be input, are automatically set in the character string input field.

Figure 13:
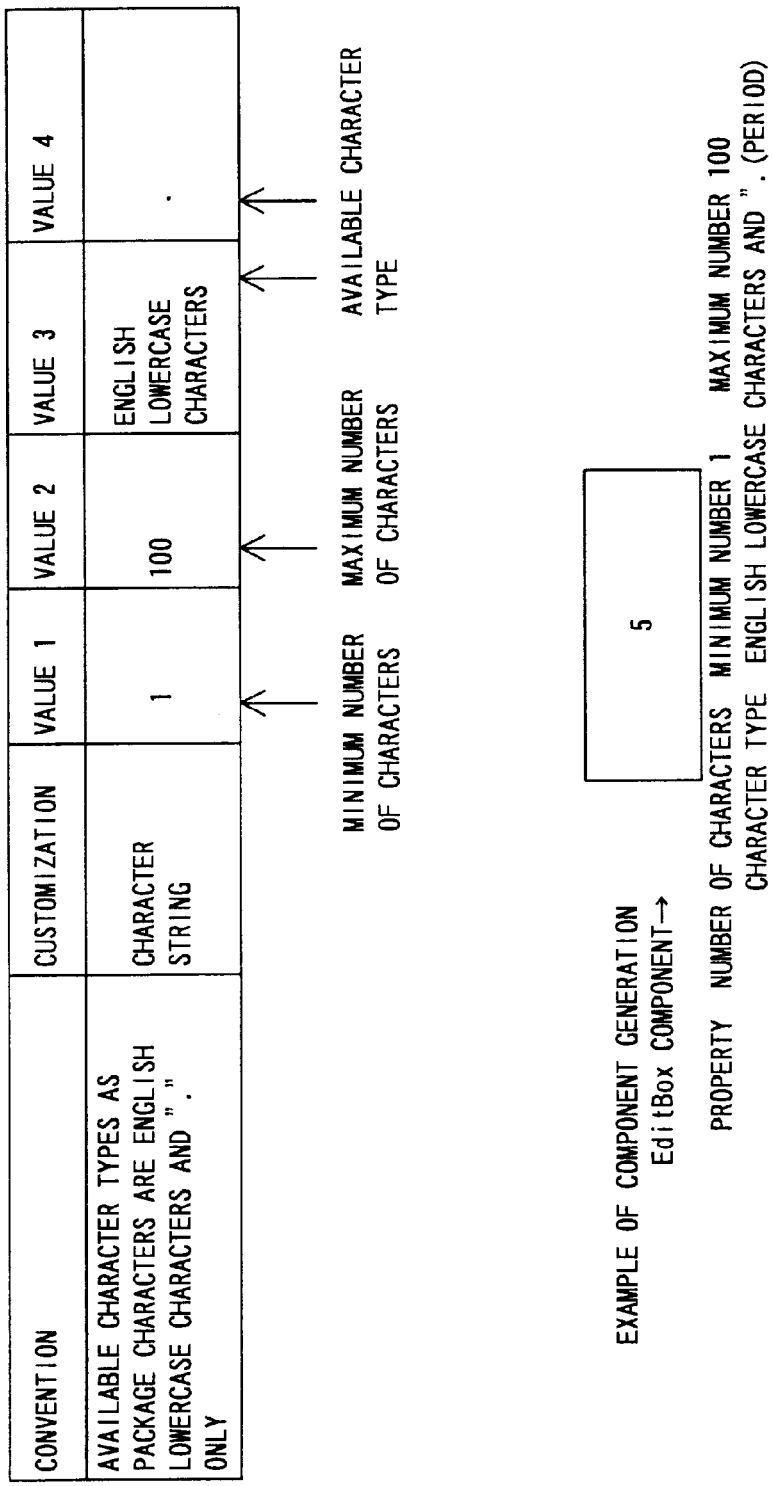
FIG. 13 explains a customization pattern for a character string input.

FIG. 13 exemplifies the contents of a customization pattern for a character string input, and a component that is automatically generated based on this pattern.

If the customization pattern for a character string input is set in a convention code, an edit box is automatically generated as a component to be displayed on a convention specification screen. In this case, "1", "100", "English lowercase characters", and ".(period)" are respectively set as values 1, 2, 3, and 4 of the customization pattern for a character string input in the convention file 14. Therefore, settings such that the minimum and the maximum numbers of characters that can be input to the edit box displayed on the convention specification screen are respectively "1" and "100", and the characters that can be input are English lowercase characters and ". (period) " are made.

FIG. 14 exemplifies the convention specification screen that is automatically generated with the above described convention specification screen generation process, and a customization instruction information file 16.

On this convention specification screen, the contents of convention codes stored in the convention file 14 are displayed. If a customization pattern is set in any of the convention codes, an edit box, a list box, etc. is displayed according to the contents of the customization pattern.

For instance, if a customization pattern is set in a convention stipulating that the number of characters per line is up to "80", and if this convention is customized to be up to 120 characters, "applied" is selected from two options "applied" and "unapplied" for the application of a convention, which are displayed at the left end of the screen, and "120" is set as the number of characters in the edit box for setting the contents of customization at the right end. In this way, a user can customize the convention stipulating that the number of characters per line is up to 80 to be a convention such that the number of characters per line is up to 120, which is applied to a particular development project.

If whether or not to apply an individual convention, a convention customization condition, etc. are set on this convention specification screen, the results of these settings are stored in the customization instruction information file 16 shown in FIG. 14.

The customization instruction information file 16 shown in FIG. 14 shows that convention codes "F1F10001 (?)" and "K1F1002" are selected to be applied (YES) as development conventions, and customization is made to apply Shift-JIS as a coding scheme of the convention code "K1F10002".

Next, the contents of the process performed by the convention checker unit 13 which checks whether or not a developed program conforms to conventions will be described by referring to the flowcharts shown in FIGS. 15 through 20 and the schematics shown in FIGS. 21 through 25.

FIG. 15 is a flowchart showing the entire process performed by the convention checker unit 13.

First of all, a convention file 14 is loaded (step S51 of FIG. 15). Then, the syntax of the program to be checked is analyzed (step S52). Then, it is determined whether or not an error occurs in the result of the analysis (sep S53). If it is determined that an error occurs in the result of the analysis ("YES" in step S53), the process proceeds to step S54 where an error message is issued.

If it is determined that an analysis error does not occur ("NO" in step S53), the process proceeds to step S55 where the customization instruction information file 16 is loaded. Then, it is determined whether or not the loaded convention (?) is the end of the customization instruction information file 16 (EOF) (step S56). If it is determined that the loaded convention is not the end of the file, it is then determined whether or not the corresponding convention code is set to be a target to be checked based on the customization instruction information (step S57).

If it is determined that the convention code is set to be a target to be checked ("YES" in step S57), a convention checking calling command for the corresponding convention code is assembled from the convention file 14, and executed (step S58).

In step S58, various convention checking operations are performed based on the information set in the convention codes within the convention file 14, that is, a class name, a method name, and method parameters. Specifically, existence checking for checking whether or not a certain definition exists in a source program, uniqueness checking for checking whether or not a certain definition is doubly defined in a source program, order checking for checking whether or not a source program is written in a specified order, naming checking for checking whether or not naming in a source program is made as specified, number checking for checking whether or not a number in a source program is within a specified range, and the like are made.

For example, if "CountCheck", "isCountCheckOK", "File", and "500" are respectively set as a class name, a method name, and parameters 1 and 2 are set in correspondence with one of the convention codes in the convention file 15 shown in FIG. 5, and if the customization instruction information instructs the application of this convention code, the number checking program is executed based on these information to check whether or not the maximum umber of lines in the file is 500.

Upon termination of particular checking, it is determined whether or not the result of the checking is an error (step S59). If it is determined that the result of the checking is not an error ("NO" in step S59), the process goes back to step S55 where the next information in the customization instruction information file 16 is read.

If it is determined that the result of the checking is an error ("YES" in step S59), the process proceeds to step S60 where the result of the checking is output in a log file format, etc. The process then goes back to step S55.

If it is determined that the loaded convention (?) is the end of the customization instruction information file 16 ("YES" in step S56), namely, if the checking has been completed for all of the conventions to be applied to the development program, the process proceeds to step S61 where all of the checking results are output, for example, in a delivery statement format.

FIG. 16 is a flowchart showing the existence checking program for checking whether or not a certain definition exists in a source program, which is executed in step S58 of FIG. 15.

First of all, the result of the syntax analysis of a source program is searched with a search condition of a syntax element defined by a parameter 1 (step S71 of FIG. 16). Next, it is determined whether or not the specified syntax element is found in the source program (step S72). If the specified syntax element is found ("YES" in step S72), it is then determined whether or not the search result, that is, the found source program code satisfies the search condition defined by a parameter 2 (step S73). If the search result does not satisfy the search condition of the parameter 2 ("NO" in step S73), the process goes back to step S71 where the search of the source program is continued.

If the search result satisfies the search condition of the parameter 2 ("YES" in step S73), "True" is set as a return value.

If a hit does not occur in the search using the syntax element specified by the parameter 1 as a keyword ("NO" in step S72), the process proceeds to step S75 where "False" is set as a return value and an error message is issued.

By way of example, if the parameter 1 is set to be a class name written in a BNF (Backus-NaurForm) format, and the parameter 2 is set to be a public class which can be externally referenced, the above described existence checking program checks whether or not the public class the name of which is written in the BNF format (?) exists.

FIG. 21 shows one example of the above described existence checking program. A program "boolean isExist (parameta1, parameta2)" shown in (1) of FIG. 21 includes a description such that "true" is returned as a return value "boolean" if the program code satisfying the conditions of the parameters 1 and 2 exists, and "false" is returned as the return value if such a code does not exist.

For example, if a search target is set to be a class name and a syntax element in a BNF format as the parameter 1, and the target is set to be a public class as the parameter 2 in the convention file 14, the existence checking program shown in (2) of FIG. 21 (?) is executed.

Figure 17:
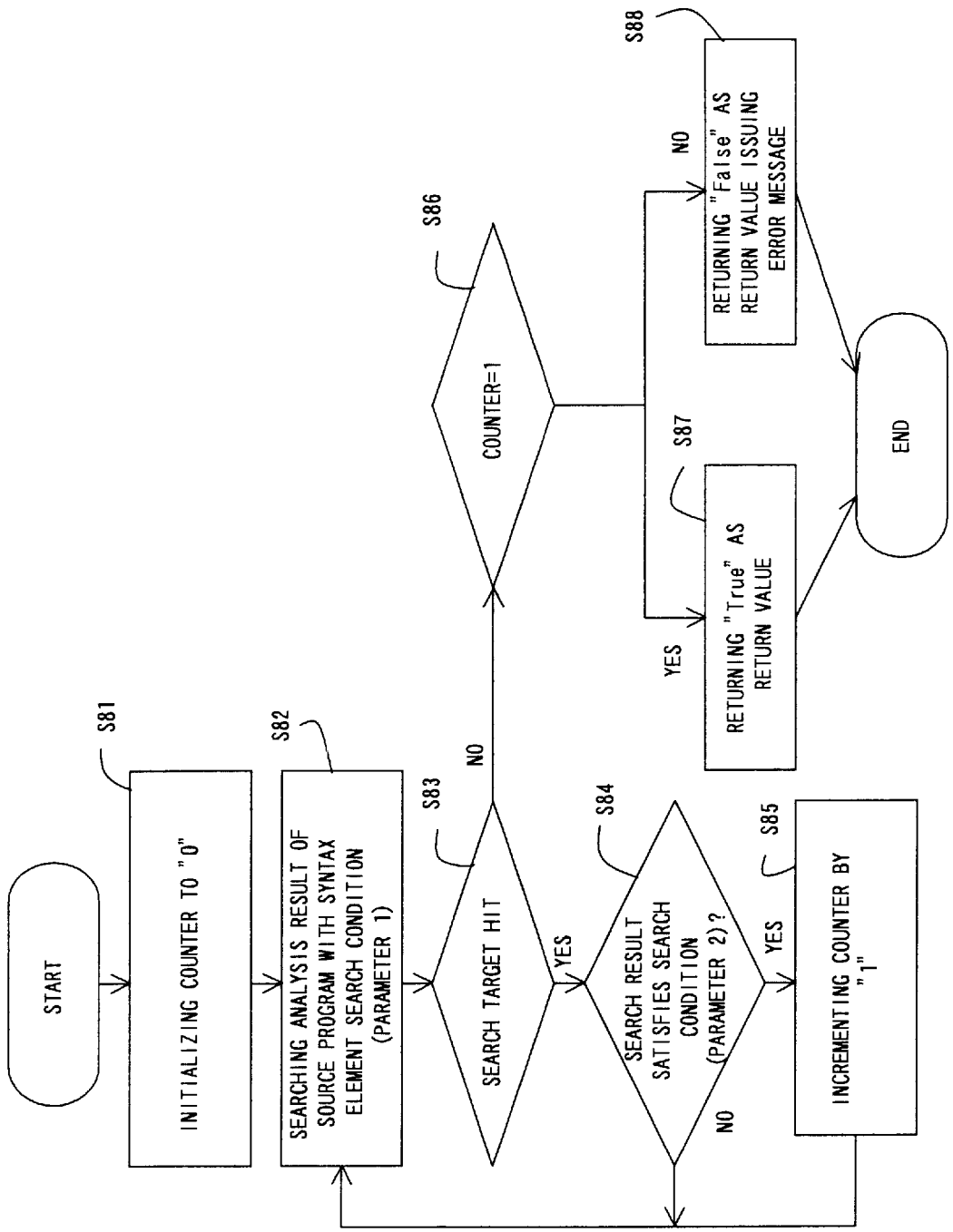
FIG. 17 is a flowchart showing the process for checking uniqueness.

FIG. 17 is a flowchart showing the uniqueness checking program for checking whether or not a certain definition is doubly defined in a source program.

First of all, a counter is initialized to "0" (step S81 of FIG. 17). Next, the result of the syntax analysis of the source program is searched with a search condition (parameter 1) of a specified syntax element (step S82). Next, it is determined whether or not the source program code satisfying this search condition exists (step S83). If the source program code satisfying the specified search condition exists (step S83), it is determined whether or not the search result satisfies the search condition of the parameter 2 (step S84).

If the search result satisfies the search condition of the parameter 2 ("YES" in step S84), the value of the counter is incremented by "1" (step S85). The process then goes back to step S82 where the search is continued.

If the program code satisfying the search condition of the parameter 1 does not exist in the source program ("NO" in step S83), the process proceeds to step S86 where it is determined whether or not the value of the counter is "1".

If the value of the counter is "1" ("YES" in step S86), this means that the program code satisfying the search conditions of the parameters 1 and 2 uniquely exists in the source program. Therefore, "True" is returned as a return value (step S87).

If the value of the counter is not "1" ("NO" in step S86), this means that the program code satisfying the search conditions of the parameters 1 and 2 does not exist in the source program, or two or more program codes exist. Therefore, "False" is returned as a return value, and an error message is issued (step S88).

Figure 22:
FIG. 22 exemplifies a uniqueness checking program.

FIG. 22 shows one example of the above described uniqueness checking program. A program "boolean isUnique(parameta1,parameta2)" shown in (3) of FIG. 22 includes a description such that "true" is returned as a return value "boolean" if a unique program code satisfying the conditions of the parameters 1 and 2 exists, and "false" is returned as the return value if such a program code does not exist.

For instance, if a search target is set to be a class name and a syntax element in a BNF format as the parameter 1, and the target is set to be a public class as the parameter 2, the uniqueness checking program shown in (4) of FIG. 22 (?) is executed to check whether or not the public class is not doubly defined.

Figure 18:
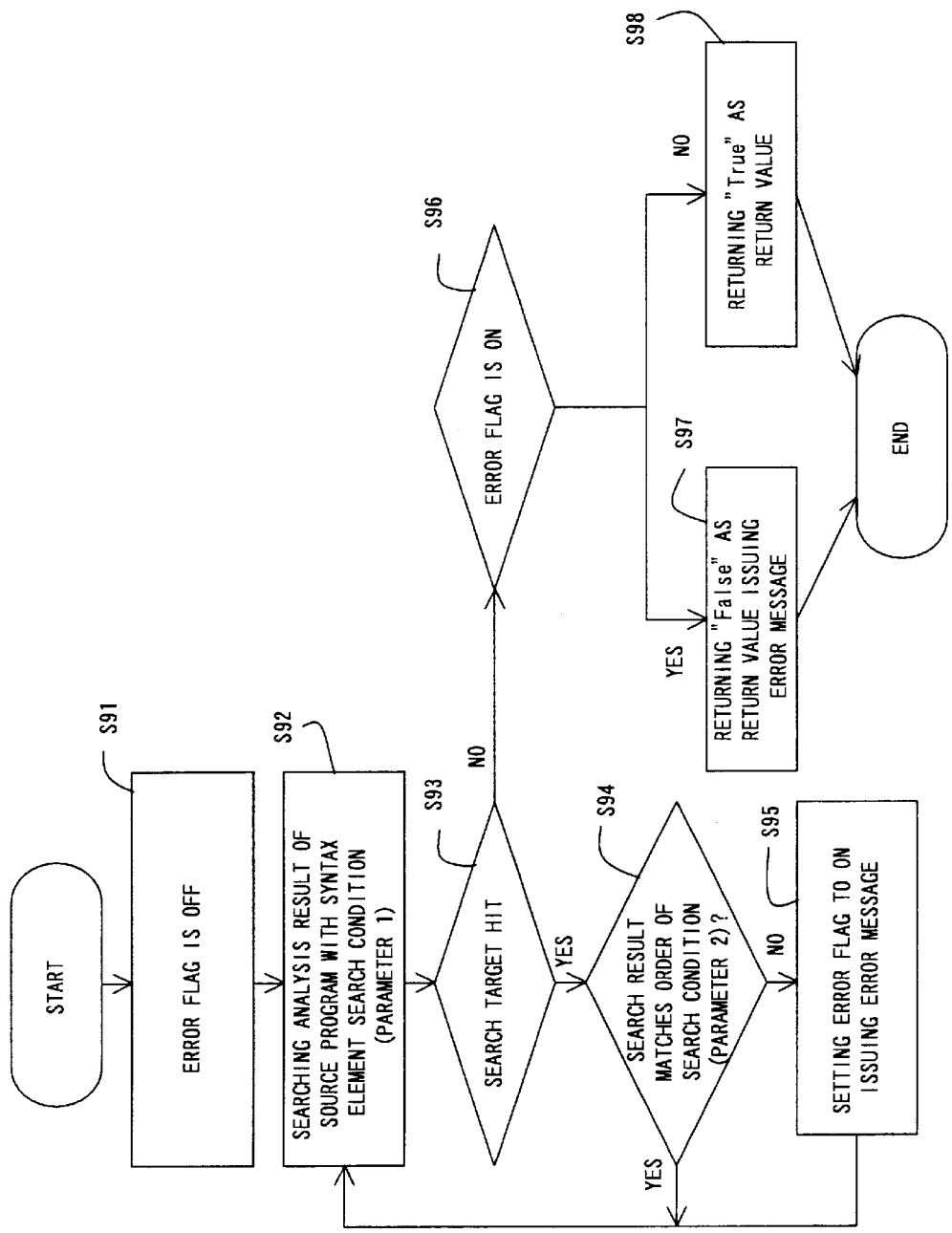
FIG. 18 is a flowchart showing the process for checking an order.

FIG. 18 is a flowchart showing the order checking program for checking whether or not a source program is written in a specified order.

First of all, an error flag is set to OFF. Next, the result of the syntax analysis of the source program is searched with a search condition of a syntax element of a parameter 1 (step S92). Then, it is determined whether or not the program code satisfying this search condition is found (step S93). If the program code matching this search condition is found ("YES" in step S93), it is determined whether or not the search result is written in the order specified by the search condition of the parameter 2 (step S94).

If the search result mismatches the specified order ("YES" in step S94), the process goes back to step S92 where the search is continued.

If the description order of the program mismatches the specified order ("NO" in step S94), the process proceeds to step S95 where the error flag is set to ON, and an error message is issued.

If no more program code matching the search condition of the parameter 1 can be found ("NO" in step S93) after searching the entire source program, the process proceeds to step S96 where it is determined whether or not the error flag is ON.

If the error flag is ON ("YES" in step S96), that is, if the program is written in an order different from the specified order, the process goes back to step S97 where "false" is returned as a return value.

If the error flag is OFF ("NO" in step S96), that is, if the source program is written in the specified order, the process proceeds to step S98 where "true" is returned as a return value.

Figure 23:
FIG. 23 exemplifies an order checking program.

FIG. 23 shows one example of the above described order checking program. A program "boolean isOrder(parameta1, parameta2)" shown in (5) of FIG. 23 includes a description such that "true" is returned as a return value "boolean" if the program is written in the order specified by the parameter 2, and "false" is returned as the return value if the program is not written in the specified order.

By way of example, if a search target is set to be a class name and a syntax element in a BNF format as the parameter 1, and an order of "public, static, final" is set as the parameter 2 in the convention file 14, the order checking program shown in (6) of FIG. 23 is executed to check whether or not the program is written in the order of "public, static, final".

Figure 19:
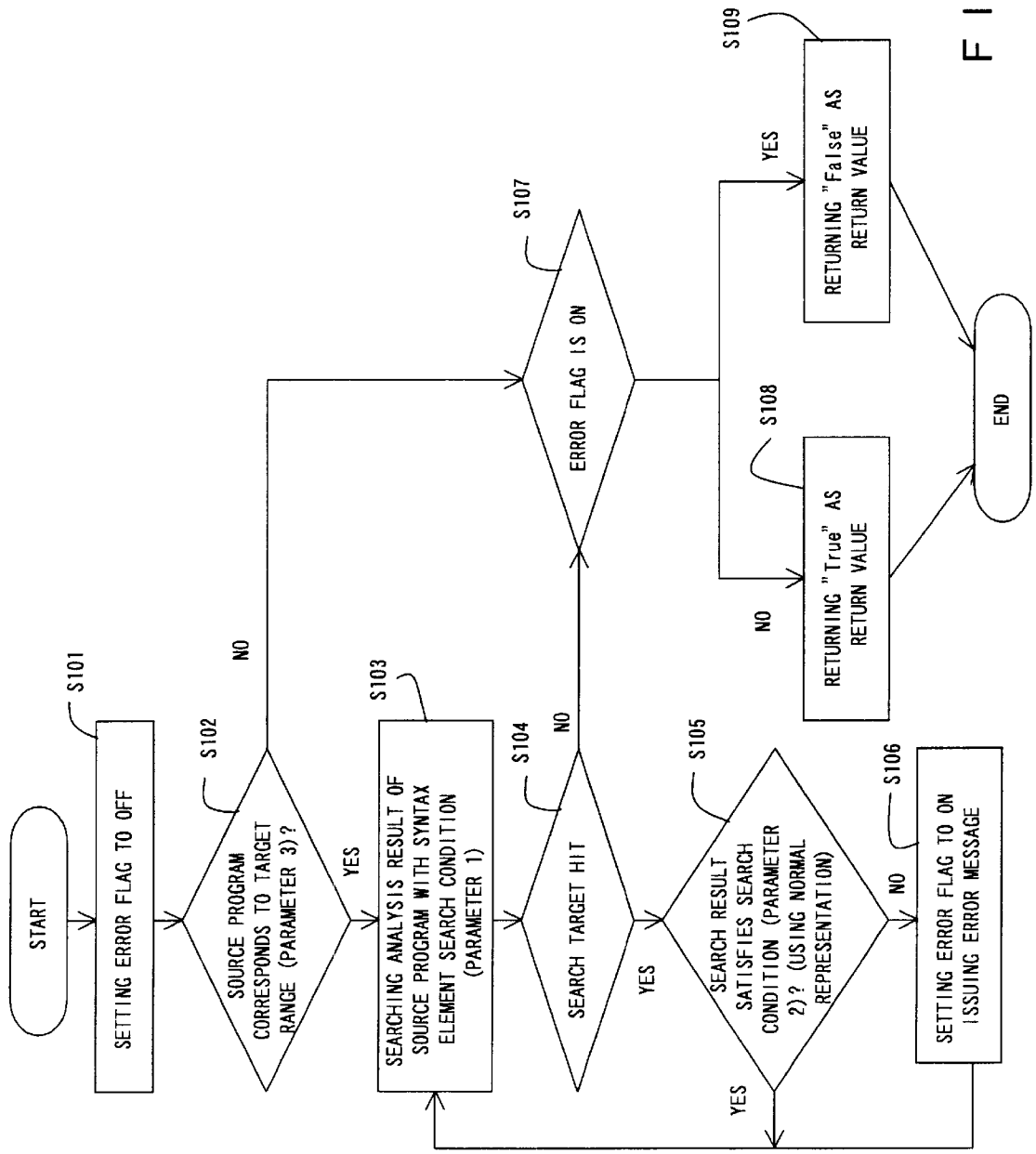
FIG. 19 is a flowchart showing the process for checking naming.

FIG. 19 is a flowchart showing the naming checking program for checking whether or not naming in a source program is made as specified.

First of all, an error flag is set to OFF (step S101 of FIG. 19). Next, it is determined whether or not a source program code corresponds to the target specified by a parameter 3 (step S102). If the source program code corresponds to the checking target ("YES" in step S102), the process proceeds to step S103 where the result of the syntax analysis of the source program is searched with the search condition of the search element specified by a parameter 1. If the source program code matching the specified syntax element exists ("YES" in step S104), the process proceeds to step S105 where it is determined whether or not the search result satisfies the naming condition specified by the parameter 2.

If the search result satisfies the naming condition ("YES" in step S105), the process goes back to step S103 where the search is continued.

If the result does not satisfy the naming condition ("NO" in step S105), the process proceeds to step S106 where the error flag is set to ON, and an error message is issued. The process then goes back to step S103.

If it is determined that the source program is not a search target ("NO" in step S102), or if a source program code satisfying the search condition specified by the parameter 1 is not found ("NO" in step S104), the process proceeds to step S107 where it is determined whether or not the error flag is ON.

If the error flag is ON ("YES" in step S107), this means that a source program code which does not satisfy the naming condition exists. The process therefore goes back to step S109 where "False" is returned as a return value.

If the error flag is OFF, this means that the naming in the source program code to be searched satisfies the naming condition. The process therefore proceeds to step S108 where "True" is returned as a return value.

FIG. 24 shows one example of the above described naming checking program. A program "boolean isNameOK (parameta1,parameta2,parameta3)" shown in (7) of FIG. 24 includes a description such that "true" is returned as a return value "boolean" if the search target program specified by a parameter 3 is named under the naming condition specified by a parameter 2, and "false" is returned as the return value if the search target program is not named under the naming condition For example, if a search target is a class name and a syntax element in a BNF format as a parameter 1, its name begins with "^CAA" as a naming condition as a parameter 2, and a Java package name is set to be a search target range (scope?) as a parameter 3 in the convention file 14, the naming checking program shown in (8) of FIG. 24 is executed to check whether or not the class name of the package specified by the parameter 3 begins with "CAA".

Figure 20:
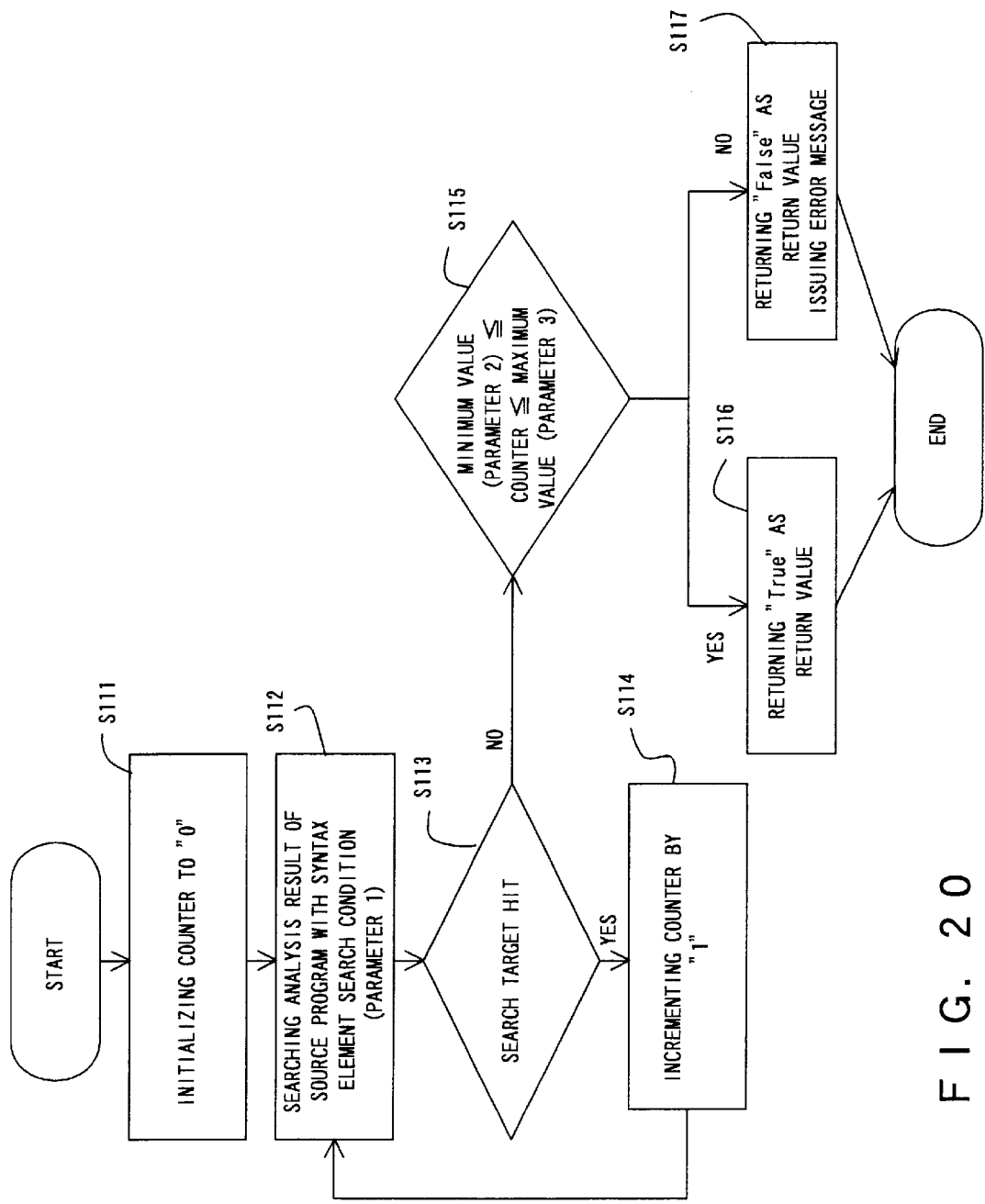
FIG. 20 is a flowchart showing the process for checking a number.

FIG. 20 is a flowchart showing the number checking program for checking whether or not the number of codes (lines?) in a source program is within a specified value range.

First of all, a counter is initialized to "0" (step S111 of FIG. 20). Next, the result of the syntax analysis of a source program is searched with the search condition of the syntax element of a parameter 1 (step S112). Then, it is determined whether or not the program code satisfying the search condition of the parameter 1 exists (step S113).

If the source program code satisfying the search condition of the parameter 1 exists ("YES" in step S113), the process proceeds to step S114 where the value of the counter is incremented by "1". The process then goes back to step S112 where the search is continued.

If no more source program code satisfying the search condition is found as a result of a thorough search in the source program ("NO" in step S113), the process proceeds to step S115 where it is determined whether or not the value of the counter is equal to or larger than the minimum value specified by the parameter 2, and whether or not the value of the counter is equal to or smaller than the maximum value (specified by the parameter 3?).

If the value of the counter is within the range specified by the parameters 2 and 3 ("YES" in step S115), this means that the number of the source program codes, which satisfies the specified search condition, is within the specified value range. The process therefore goes back to step S116 where "True" is returned as a return value.

If the value of the counter is out of the range specified by the parameters 2 and 3 ("NO" in step S115), this means that the number of the source program codes, which satisfies the search condition, is smaller than the specified minimum value or exceeds the maximum value. The process therefore proceeds to step S117 where "False" is returned as a return value to notify the violation of the convention.

FIG. 25 shows one example of the above described number checking program. A program "boolean isCountOk (parameta1,parameta2, parameta3)" shown in (9) of FIG. 25 includes a description such that it is checked whether or not the number of lines of the method specified by a parameter 1 is within the range specified by parameters 2 and 3, "true" is returned as a return value "boolean" if the number of lines is within the range, and "false" is returned as the return value if the number of lines is out of the range.

For example, if a search target is set to be a method and a syntax element in a BNF format as a parameter 1, and the minimum value (such as "1") and the maximum value (such as "100") are respectively set as parameters 2 and 3 in the convention file 14, the number checking program shown in (10) of FIG. 25 is executed to check whether or not the convention stipulating that the number of lines of the method is up to 100 is conformed.

The above described preferred embodiment refers to the case where the convention checking apparatus 11 comprises both of the convention specification screen generation capability and the convention checking capability. However, the convention checking apparatus may comprise only the convention checking capability.

FIG. 26 shows the configuration of a convention checking apparatus 31 which does not comprise a convention specification screen generation capability, according to a second preferred embodiment.

The fundamental configuration of the convention checking apparatus 31 is the same as that of the convention checking apparatus 11 shown in FIG. 3 except that this apparatus 31 does not comprise a convention specification screen capability unit 15 for generating a convention specification screen based on the contents of a convention file 14.

According to the second preferred embodiment, the convention specification screen (such as a GUI screen) generation capability intended to customize a convention for each project may be arranged in a different device. Or, the convention method with which a user modifies a program when a convention is changed or added may be adopted without arranging the convention specification screen generation capability.

FIGS. 27 and 28 exemplify the outputs of convention checking results. FIG. 27 shows the case where a checking result is output in a log file format, whereas FIG. 28 shows the case where a checking result is output in a delivery statement format.

Which convention codes a source program violates can be determined from these output results. Additionally, in the example of the output of the delivery statement format shown in FIG. 28, the line number in a source program, which violates a convention code, is output for each convention code. Therefore, it is easy to grasp the contents of violation and its location.

Figure 29:
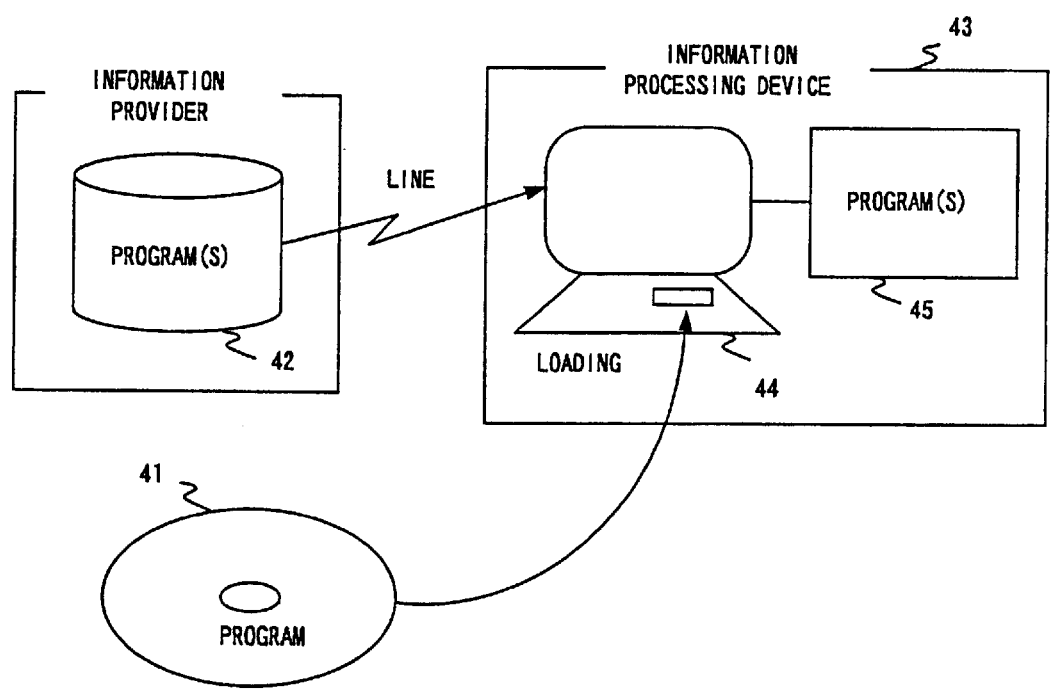
FIG. 29 explains storage media.

FIG. 29 explains the case where a program for implementing the checking capability of the above described convention checking apparatus 11 is stored onto a portable storage medium 41 such as a CD-ROM, a floppy disk, etc., or in a storage device 42 possessed by a program provider, and the program is loaded into an information processing device 43 of a user, and executed.

If the program for executing convention checking is stored onto the portable storage medium 41 such as a floppy disk, etc., the portable storage medium 41 is inserted into a disk drive (?) 44, and the program is loaded. The loaded program is then stored in a memory 45 such as a RAM, a hard disk, etc., and executed. If the program is provided from a program provider via a communications line, the program stored in the memory, the storage device 42, etc. of the program provider is received by the information processing device 43 via a communications line. The received program is stored in the memory 45 such as a RAM, a hard disk, etc., and executed. Note that the program recorded onto the storage medium 41 may include a partial capability of the programs referred to in the preferred embodiments.

According to the above described preferred embodiments, the information for specifying a convention checking program, and the information for specifying an application condition of a convention are stored in a convention file 14, and whether or not a developed program conforms to conventions is checked based on the convention file 14, so that it becomes unnecessary for a user to modify the convention checking program. Additionally, if a convention is changed or added, the only operation that a user must perform is to modify the convention file 14, and there is no need to modify the convention checking program itself, thereby taking a quick action even if convention changes or modifications are frequently made.

Furthermore, a convention specification screen is automatically generated based on the information for specifying a customization pattern in a convention file 14, so that it becomes unnecessary for a user to modify the program for generating a convention specification screen, and a user load is reduced.

The above described preferred embodiments refer to the case where a program is generated in an object-oriented programming language. However, the present invention is not limited to an object-oriented programming language, and is applicable to a program written in any language.

Additionally, the above described preferred embodiments refer to the case where the convention file 14, the customization instruction information file 16, the program source 19 (?) are stored in an external storage device connecting to the convention checking apparatus. However, these files may be stored in a different device, and accessed or downloaded via a communications line.

According to the present invention, even if a convention is changed or added, a user modifies the information about a convention checking program within a convention storing unit, and whether or not a program conforms to conventions is checked based on the information. Accordingly, it is unnecessary for a user to modify the convention checking program, thereby taking a quick action for a convention change or addition. Furthermore, by setting a convention customization pattern in a convention storing unit, a convention specification screen for customizing a convention can automatically be generated based on the customization pattern.

What is claimed is:

1. A convention checking apparatus checking whether or not a program conforms to conventions being standards when the program is developed, comprising:

a convention storing unit to store program specification information to specify a convention checking program checking whether or not a developed program conforms to a convention, and customizing patterns, each of the customizing patterns including component specification information to specify a component that is displayed on a convention specifying screen to be used to input information required when changing the convention checking program and property specification information to specify numeric values or letters to be displayed in the component;

a convention specifying screen generation unit to generate the convention specifying screen to display, when a respective customizing pattern is changed, the component and the numeric values or letters that are inputtable into the component according to a new customizing pattern;

a customization instruction information storage unit to store, when a numeric value or a letter string is input using the convention specifying screen that is generated by said convention specifying screen generation unit in correspondence to a new convention, the input numeric value or input letter string as customization instruction information; and a controlling unit to execute the convention checking program based on the program specification information stored in said convention storing unit and the customization instruction information stored in said customization instruction information storage unit, and to check whether or not the developed program conforms to the convention.

2. The convention checking apparatus according to claim 1, wherein the component displayed on said convention specifying screen is a list box or edit box designed to present numeric values, ranges on a number line or letters that are acceptable as an input, and enables changing the property specification information that is to specify a numeric value, a range in a number line or letters to be displayed in a list box or edit box and stored in said convention storing unit.

3. The convention checking apparatus according to claim 1, wherein
the program specification information stored in said convention storing unit is composed of a class name and a method name of the convention checking program.

4. The convention checking apparatus according to claim 1, wherein
said convention storing unit stores, for a uniquely determined convention code, contents of the convention, the program specification information, application condition information of the convention or information modified in correspondence with a change or an addition of the convention.

5. The convention checking apparatus according to claim 1, wherein the convention storing unit stores application condition information to specify an application condition of the convention and the application condition comprises method parameters.

6. A convention checking system checking whether or not a program conforms to conventions being standards when the program is developed, comprising:
a convention storage device to stores program specification information to specify a convention checking program checking whether or not a developed program conforms to a convention, and customizing patterns, each of the customizing patterns including component specification information to specify a component that is displayed on a convention specifying screen to be used to input information required when changing the convention checking program and property specification information to specify numeric values or letters to be displayed in the component;
a customization instruction information storage device to store numeric values or letter strings that are inputtable as customization instruction information; and
a convention checking apparatus, which is connected to said convention storage device and said customization instruction information storage device via one or more communication lines, to execute a convention checking program based on the program specification information stored in said convention storage device and the customization instruction information stored in said customization instruction information storage device, and to check whether or not the developed program conforms to the convention, the convention checking apparatus comprising a convention specifying screen generation unit to generate the convention specifying screen to display, when a respective customizing pattern is changed, the component and the numeric values or the letters that are inputtable into the component according to a new customizing pattern,
wherein the customization instruction information storage device stores the numeric values or letter strings, when the numeric values or the letter strings are input using the convention specifying screen generated by said convention specifying screen generation unit in correspondence to a new convention.

7. A convention checking method checking whether or not a program conforms to conventions being standard when the program is developed, comprising:
storing program specification information specifying a convention checking program checking whether or not a developed program conforms to a convention, and customizing patterns, each of the customizing patterns including component specification information specifying a component that is displayed on a convention specifying screen to be used to input information required when changing the convention checking program and property specification information specifying numeric values or letters to be displayed in the component;
generating the convention specifying screen displaying, when a respective customizing pattern is changed, the component and the numeric values or letters that are inputtable into the component according to a new customizing pattern;
storing, when a numeric value or a letter string is input using the generated convention specifying screen in correspondence to a new convention, the input numeric value or input letter string as customization instruction information; and
causing the convention checking program to be executed to check whether or not the developed program conforms to the convention based on the program specification information and the customization instruction information.

8. A convention checking method checking whether or not a program conforms to conventions being standards when the program is developed, comprising:
storing program specification information specifying a convention checking program checking whether or not a developed program conforms to a convention, application condition information specifying an application condition of the convention, and a customization pattern customizing the convention;
generating a convention specification screen customizing the convention based on the customization pattern, each customization pattern including component specification information specifying a component that is displayed on the convention specification screen to be used to input information required when changing the convention checking program and the property specification information specifying numeric values or letters to be displayed in the component, the convention specifying screen being generated to display, when the customization pattern is changed, the component and the numeric values or letters that are inputtable into the component according to a new customization pattern;
storing customization instruction information indicating contents of convention customization input from the convention specification screen; and
causing the convention checking program to be executed to check whether or not the developed program conforms to a customized convention based on the program specification information, the application condition information, and the customization instruction information.

9. A storage medium on which is recorded a program for causing a computer to execute a process checking whether or not a program conforms to conventions being standards when the program is developed, said program comprising:
storing program specification information specifying a convention checking program checking whether or not a developed program conforms to a convention, and customizing patterns, each of the customizing patterns including component specification information specifying a component that is displayed on a convention specifying screen to be used to input information required when changing the convention checking program and property specification information specifying numeric values or letters to be displayed in the component;

generating the convention specifying screen displaying, when a respective customizing pattern is changed, the component and the numeric values or letters that are inputtable into the component according to a new customizing pattern; storing, when a numeric value or a letter string is input using the generated convention specifying screen in correspondence to a new convention, the input numeric value or input letter string as customization instruction information; and executing the convention checking program based on the program specification information and the customization instruction information, and checking whether or not the developed program conforms to the convention.

10. A storage medium on which is recorded a program for causing a computer to execute a process checking whether or not a program conforms to conventions being standards when the program is developed, said program comprising:

storing program specification information specifying a convention checking program checking whether or not a developed program conforms to a convention, application condition information specifying an application condition of the convention, and a customization pattern customizing the convention;

generating a convention specification screen customizing the convention based on the customization pattern, each customization pattern including component specification information specifying a component that is displayed on the convention specification screen to be used to input information required when changing the convention checking program and the property specification information specifying numeric values or letters to be displayed in the component, the convention specifying screen being generated to display, when the customization pattern is changed, the component and the numeric values or letters that are inputtable into the component according to a new customization pattern;

generating customization instruction information indicating contents of convention customization input from the convention specification screen; and executing the convention checking program based on the program specification information, the application condition information, and the customization instruction information, and checking whether or not the developed program conforms to a customized convention.

11. A convention checking apparatus checking whether a program conforms to conventions being standards when the program is developed, comprising:

a convention storing unit to store program specification information to specify a convention checking program checking whether a developed program conforms to a convention, and customizing patterns, each of the customizing patterns including component specification information to specify a component to input information required when changing the convention checking program and property specification information to specify numeric values or letters to be displayed in the component;

a convention specifying screen generation unit to automatically generate the convention specifying screen in which the component and the numeric values or letters that are inputtable into the component are displayed according to a new customizing pattern;

a customization instruction information storage unit to store the numeric value or letter string as inputted customization instruction information; and a controlling unit to execute the convention checking program based on the program specification information stored in said convention storing unit and the inputted customization instruction information stored in said customization instruction information storage unit, and to check whether the developed program conforms to the convention.

12. A convention checking method checking whether or not a program conforms to conventions being standard when the program is developed, comprising:

storing program specification information specifying a convention checking program checking whether a developed program conforms to a convention, and customizing patterns, each of the customizing patterns including component specification information specifying a component to input information required when changing the convention checking program and property specification information specifying numeric values or letters to be displayed in the component;

automatically generating the convention specifying screen in which the component and the numeric values or letters that are inputtable into the component are displayed according to a new customizing pattern;

storing the numeric value or letter string as input customization instruction information; and causing the convention checking program to be executed to check whether the developed program conforms to the convention based on the program specification information and the input customization instruction information.

13. A storage medium on which is recorded a program for causing a computer to execute a process checking whether a program conforms to conventions being standards when the program is developed, said program comprising:

storing program specification information specifying a convention checking program checking whether a developed program conforms to a convention, and customizing patterns, each of the customizing patterns including component specification information specifying a component to input information required when changing the convention checking program and property specification information specifying numeric values or letters to be displayed in the component;

automatically generating the convention specifying screen in which the component and the numeric values or letters that are inputtable into the component are displayed according to a new customizing pattern;

storing the numeric value or letter string as input customization instruction information; and executing the convention checking program based on the program specification information and the input customization instruction information, and checking whether the developed program conforms to the convention.

* * * * *

UNITED STATES PATENT AND TRADEMARK OFFICE
CERTIFICATE OF CORRECTION

PATENT NO. : 6,763,516 B2
DATED : July 13, 2004
INVENTOR(S) : Ryoko Fujikawa

It is certified that error appears in the above-identified patent and that said Letters Patent is hereby corrected as shown below:

Column 17,
Line 22, change "stores" to -- store --

Column 19,
Line 5, insert a paragraph return after "pattern;"

Signed and Sealed this

Twenty-eighth Day of December, 2004

JON W. DUDAS
*Director of the United States Patent and Trademark Office*